(12) United States Patent
Krogue et al.

(10) Patent No.: US 8,293,105 B2
(45) Date of Patent: Oct. 23, 2012

(54) CONTAMINANT ADSORPTION FILTRATION MEDIA, ELEMENTS, SYSTEMS AND METHODS EMPLOYING WIRE OR OTHER LATTICE SUPPORT

(75) Inventors: John A. Krogue, Mineral Wells, TX (US); Timothy L. Holmes, Kingwood, TX (US)

(73) Assignee: Perry Equipment Corporation, Mineral Wells, TX (US)

( * ) Notice: Subject to any disclaimer, the term of this patent is extended or adjusted under 35 U.S.C. 154(b) by 657 days.

(21) Appl. No.: 12/468,386

(22) Filed: May 19, 2009

(65) Prior Publication Data

US 2009/0294348 A1    Dec. 3, 2009

Related U.S. Application Data

(60) Provisional application No. 61/056,898, filed on May 29, 2008.

(51) Int. Cl.
*B01D 24/00* (2006.01)
*B01D 29/00* (2006.01)
*B01D 39/00* (2006.01)

(52) U.S. Cl. ............... 210/266; 210/497.01; 210/502.1; 55/512

(58) Field of Classification Search .............. 210/497, 210/502.1, 120–300, 497.01; 55/498, 512, 55/517
See application file for complete search history.

(56) References Cited

U.S. PATENT DOCUMENTS

| | | | |
|---|---|---|---|
| 4,294,697 A * | 10/1981 | Sawa et al. ............... 210/221.1 |
| 5,772,783 A * | 6/1998 | Stucker ........................ 134/12 |
| 5,893,956 A | 4/1999 | Perry, Jr. et al. |
| 6,326,326 B1 * | 12/2001 | Feng et al. ...................... 502/62 |
| 6,531,224 B1 | 3/2003 | Fryxell et al. |
| 6,733,835 B2 | 5/2004 | Fryxell et al. |
| 6,753,038 B2 | 6/2004 | Fryxell et al. |
| 6,783,119 B2 | 8/2004 | Zich et al. |
| 6,846,554 B2 | 1/2005 | Fryxell et al. |
| 6,874,769 B2 | 4/2005 | Lantz et al. |
| 2005/0040090 A1 * | 2/2005 | Wang et al. ................. 210/184 |
| 2005/0211615 A1 * | 9/2005 | DiLeo et al. ............. 210/198.2 |
| 2006/0101999 A1 | 5/2006 | Steins |
| 2007/0095203 A1 | 5/2007 | Paris et al. |
| 2007/0256980 A1 | 11/2007 | Krogue et al. |
| 2007/0256981 A1 | 11/2007 | Krogue et al. |
| 2007/0262025 A1 | 11/2007 | Krogue et al. |

(Continued)

OTHER PUBLICATIONS

Yuranov et al., 2005, NPL, "Zeolite/sintered metal fibers composites as effective structured atalysis", Applied Catalysis A: General 281: 55-60.*

(Continued)

*Primary Examiner* — Christopher Upton
*Assistant Examiner* — Nader Hossaini
(74) *Attorney, Agent, or Firm* — Reinhart Boerner Van Deuren P.C.

(57) ABSTRACT

A contaminant adsorption is provided that includes a self-assembled monolayers on mesoporous supports (SAMMS) on a lattice support structure such as sintered metal wire mesh. Individual wire fibers of the sintered wire mesh may have a film coating of mesoporous material that is functionalized for a target metal. The mesh material is formed into filtration elements with or without particulate filtration media. Systems employing such filtration elements in one or multiple stages are also disclosed with an optional acid was stripping system for regenerating SAMMS and to facilitate reclamation of contaminants that can be refined into usable commercial materials.

59 Claims, 19 Drawing Sheets

U.S. PATENT DOCUMENTS

| | | |
|---|---|---|
| 2007/0262027 A1 | 11/2007 | Krogue et al. |
| 2007/0295204 A1 | 12/2007 | Krogue et al. |
| 2008/0011683 A1 | 1/2008 | Dong et al. |
| 2008/0128364 A1 | 6/2008 | Cloud et al. |
| 2009/0032472 A1 | 2/2009 | Krogue et al. |

OTHER PUBLICATIONS

I. Yuranov et al.; Structured Combustion Catalysts Based on Sintered Metal Fibre Filters; Institute of Chemical Engineering publication; Jul. 10, 2003; 12 pages, pp. 217-227; vol. 43 No. 3 ISSN: 0926-3373; Applied Catalysis B: Environmental; Elsevier Science B.V.

I. Yuranov et al.; Pd/SiO$_2$ Catalysts: Synthesis of Pd Nanoparticles with the Controlled Size in Mesoporous Silicas; Journal of Molecular Catalysis A: Chemical publication; Feb. 3, 2003; 14 pages, pp. 239-251; vol. 192 No. 1-2 ISSN: 1381-1169; Elsevier Science B.V.

C. Horny et al.; Micro-Structured String-Reactor for Autothermal Production of Hydrogen; Chemical Engineering Journal 101; 2004; 7 pages, pp. 3-9; Elsevier.

L. Kiwi-Minsker et al.; Microstructured Reactors for Catalytic Reactions; Institute of Chemical Engineering publication; Dec. 15, 2005; 20 pages, pp. 2-14; vol. 110 No. 1-2 ISSN: 0920-5861; Elsevier B.V.

I. Yuranov et al.; Metal Grids with High-Porous Surface as Structured Catalysts: Preparation, Characterization and Activity in Propane Total Oxidation; Institute of Chemical Engineering publication; Mar. 8, 2002; 9 pages, pp. 183-191; vol. 36 No. 3 ISSN: 0926-3373; Applied Catalysis B: Environmental; Elsevier Science B.V.

B. Louis et al.; Synthesis and Characterization of MCM-41 Coatings on Stainless Steel Grids; Catalysis Communications 3 publication; 2002; 5 pages, pp. 159-163; Elsevier Science B.V.

Koch-Glitsch; Gauze Structured Packing; Bulletin KGP-6; 2000; 8 pages, pp. 1-8; Koch-Glitsch, Inc.

SAMMS Adsorbents by Steward; http://sammsadsorbents.com Website, last visited Mar. 14, 2008; 27 pages.

Southwest Screens & Filters; http://southwest.e-start.be/eng/products-filtermedia.asp Website, last visited Apr. 2, 2008; 2 pages.

Koch-Glitsch; http://koch-glitsch.com Website, last visited Apr. 2, 2008; 6 pages.

Montz Dividing Wall Columns; http://www.montz.de Website, last visited Mar. 13, 2008; 8 pages.

Bekaert; Metal filter elements and systems; product pamphlet; 2006; 15 pages, pp. 1-15; Bekaert Advanced Filtration SA.

* cited by examiner

FIG. 3
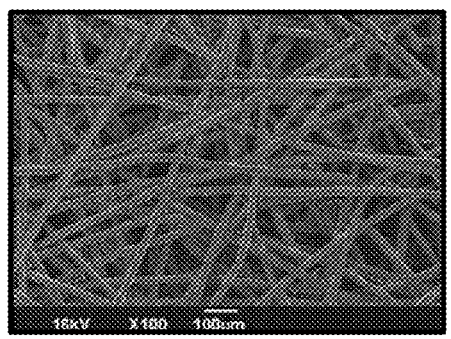
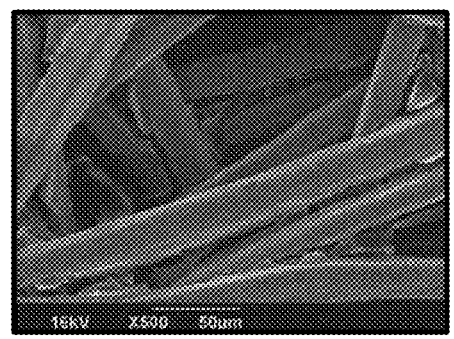
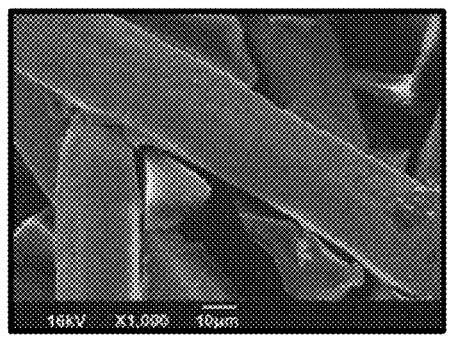
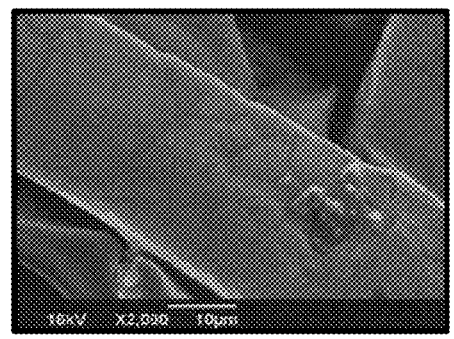

FIG. 4
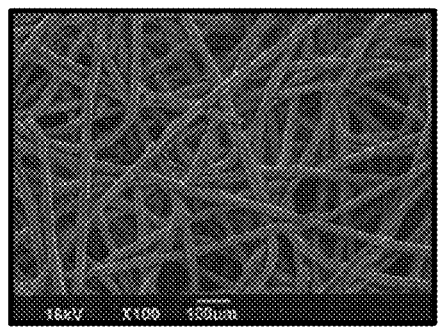
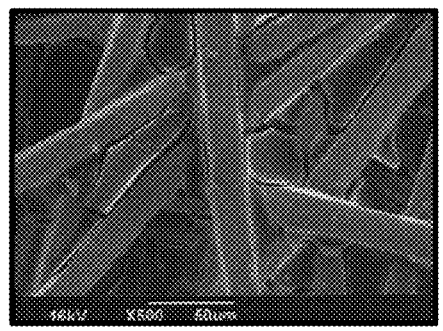
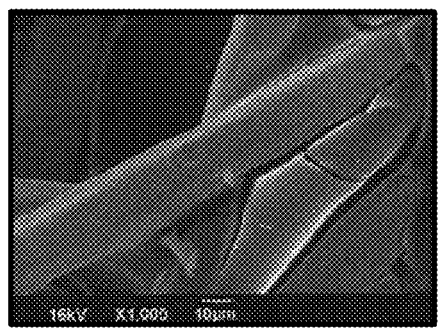
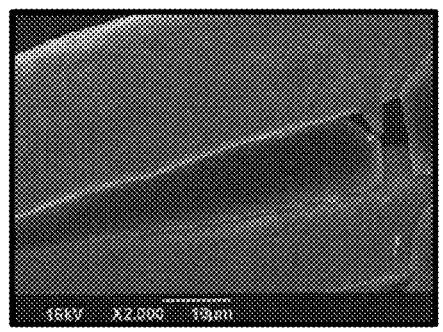
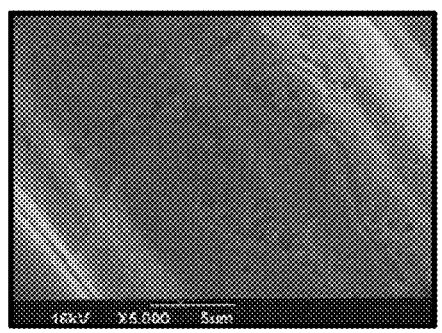

FIG. 5
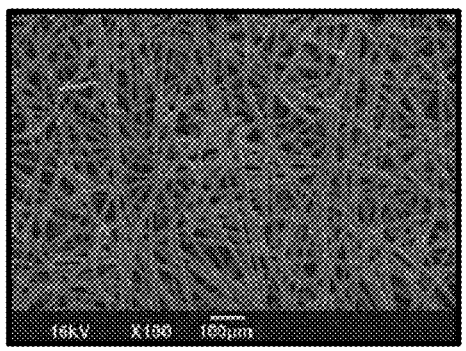
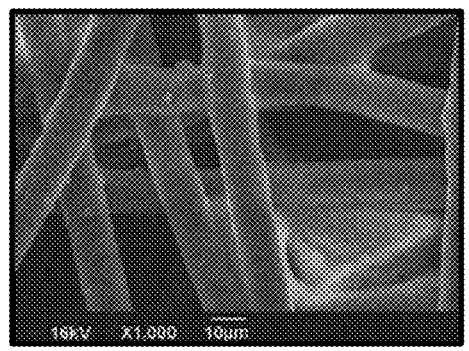
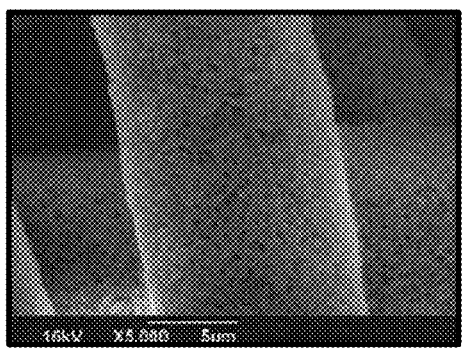
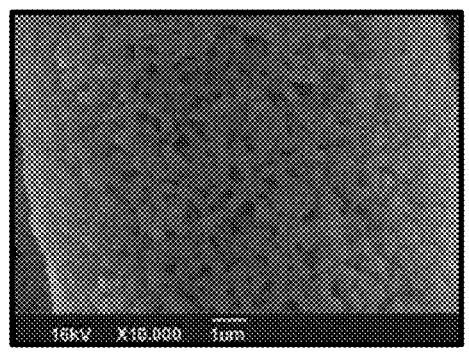

FIG. 6
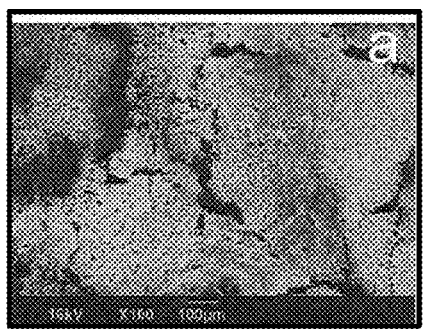
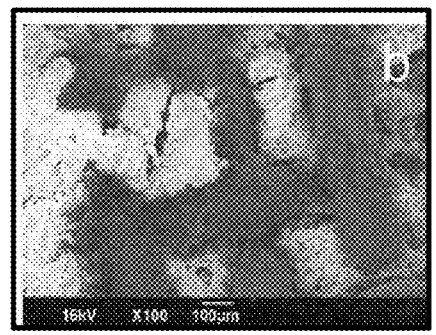
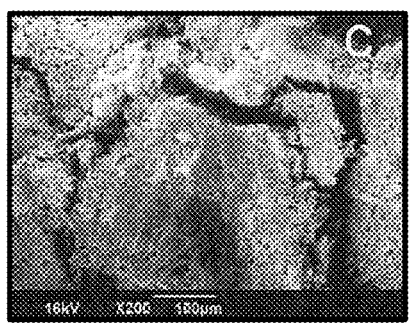
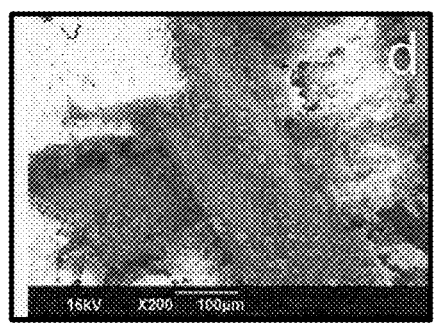
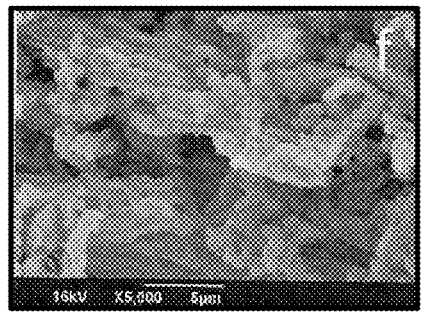
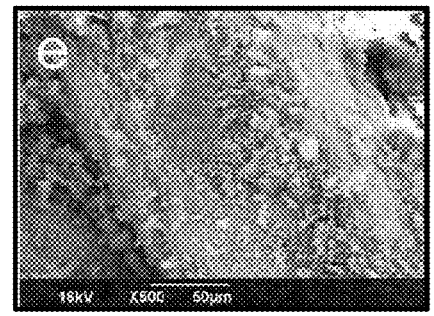
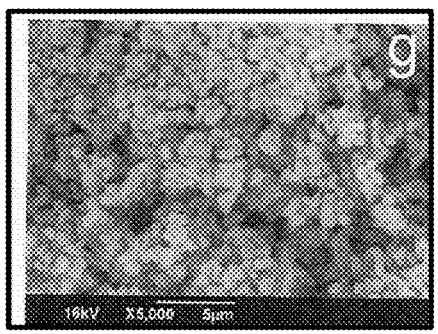
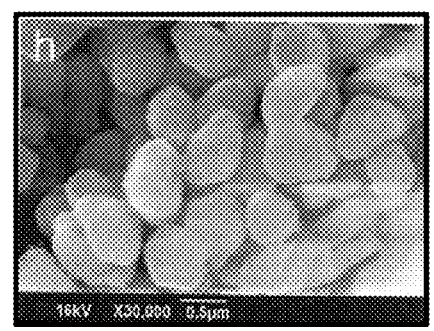

FIG. 7
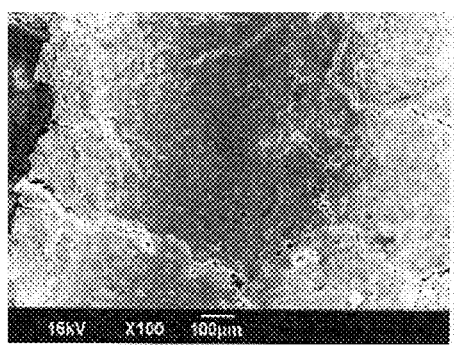
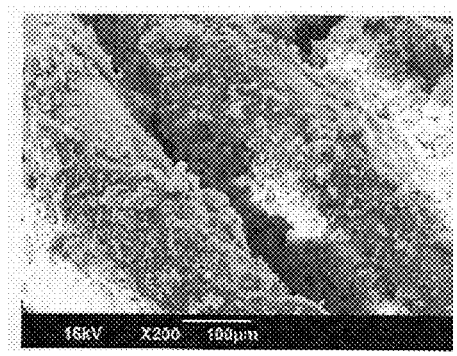
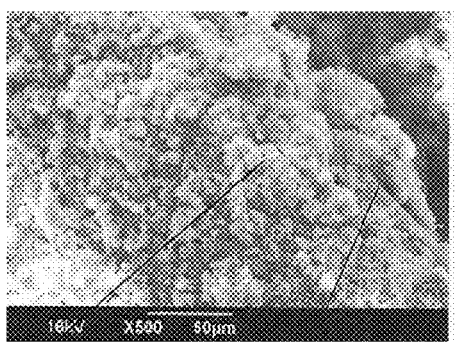
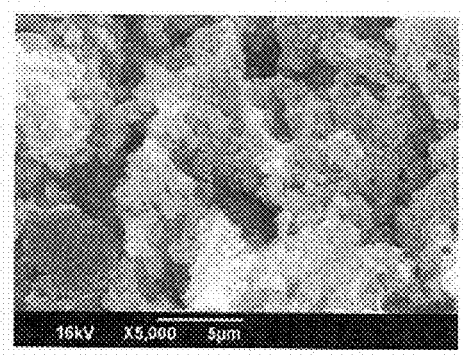
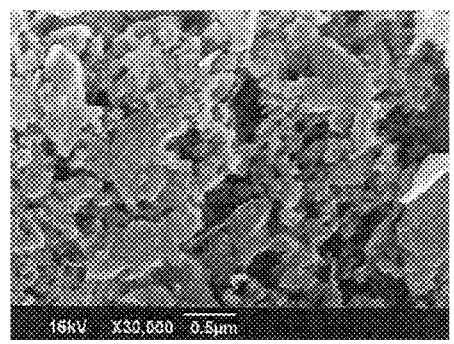

FIG. 8
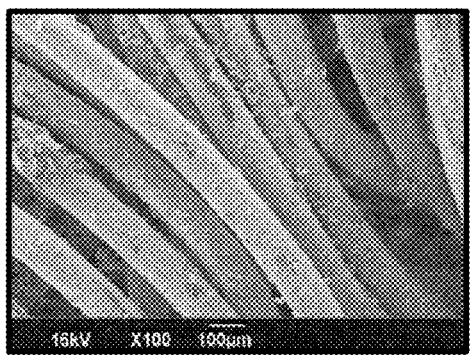 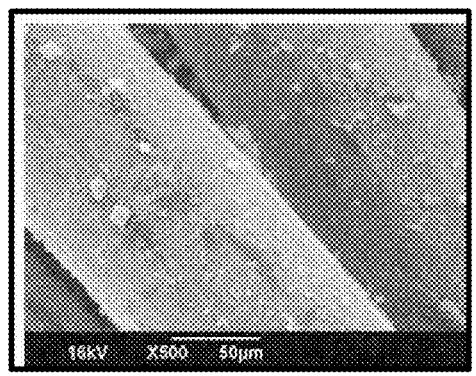
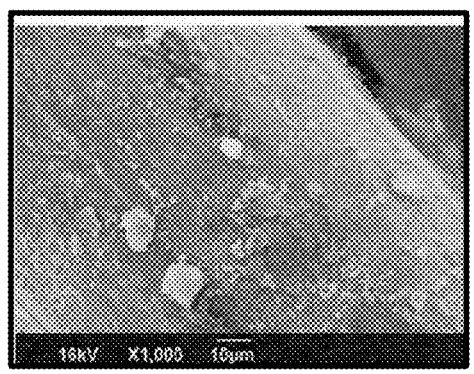 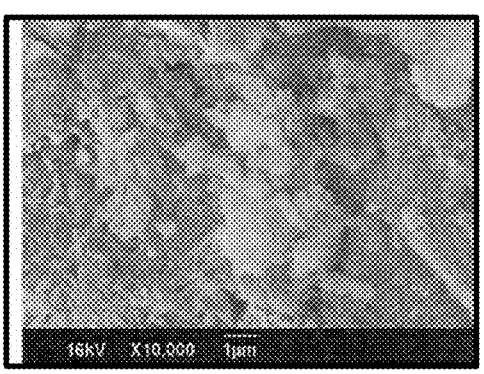

US 8,293,105 B2

CONTAMINANT ADSORPTION FILTRATION MEDIA, ELEMENTS, SYSTEMS AND METHODS EMPLOYING WIRE OR OTHER LATTICE SUPPORT

FIELD OF THE INVENTION

This invention generally relates to filtration media, filter elements, filtration systems and methods for the treatment of contaminated fluids and more particularly to such apparatuses and methods for the removal of toxic heavy metals utilizing a contaminant adsorbent, an exemplary example being self-assembled monolayers on mesoporous supports (SAMMS), that is structured with a porous lattice support structure such as wire to provide a structured combination of macropores for fluid flow and micropores for surface area for contaminant adsorption.

BACKGROUND OF THE INVENTION

There are many situations where toxic heavy metals such as mercury are contained in fluid streams (both gaseous and liquid). For example, produced water from offshore oil platforms can have mercury levels that range from less than 100 parts per billion (ppb) in the gulf of Mexico to about 2,000 ppb in the Gulf of Thailand. Complicating matters is that in many applications, sediments and other undesirable particles may also be present in many environmental applications. Removal of such toxic heavy metals to acceptable levels, while the subject of a long felt desire and need, has been typically satisfied with either inadequate, difficult and/or expensive solutions.

The use of particles of self-assembled monolayers on mesoporous supports (SAMMS) have shown to have substantial capabilities for adsorbing toxic metal contaminants. An example SAMMS material is disclosed in U.S. Pat. Nos. 6,326,326; 6,531,224; 6,733,835; 6,753,038; and 6,846,554, the entire disclosures of which are hereby incorporated by reference. One type of SAMMS is thiol-SAMMS, in which the mesoporous material is functionalized with molecules of a thiol group. Thiol-SAMMS is commercially available as particles in a powder-like form from Steward Environmental Solutions, LLC of Chattanooga, Tenn. The SAMMS powder material typically can have different particle diameters that are typically in the range of between about 30 and about 200 micron (Steward Environmental Solutions, LLC advertises an average diameter of 40 micron). On the one hand, providing a larger diameter is beneficial from a fluid flow standpoint in that a fixed bed of powder material allows for greater fluid flow. However, larger adsorbent particles do not have as much effective available surface area for contaminant adsorption. While smaller SAMMS powder material provides for greater effective surface area and adsorption potential, packing such small powder is highly restrictive to fluid flow and can create difficulties from a fluid flow standpoint.

SAMMS has extremely fast kinetics and a sizeable loading capacity (e.g. 0.4-0.6 grams HG/gram of THIOL-Samms adsorbent for terminal HG concentration of 100-200 ppm). Additionally, SAMMS works through covalently bonding for reliable retention of toxic metal contaminant. SAMMS typically has a bulk density of between approximately 0.2 g/cc and 0.4 g/cc.

Various examples have been disclosed for using such SAMMS powder particles. For example, various SAMMS filtration systems are disclosed in U.S. Patent Publication Nos. US 2007/0295204 A1 entitled "Systems And Methods For Flow-Through Treatment Of Contaminated Fluid"; US 2007/0262027 A1 entitled "Layered Filter For Treatment Of Contaminated Fluids"; US 2007/0262025 A1 entitled "Canister For Treatment Of Contaminated Fluids"; US 2007/0256981 A1 entitled "Composite Adsorbent Block For The Treatment of Contaminated Fluids"; and US 2007/0256980 entitled "Countercurrent Systems And Methods For Treatment Of Contaminated Fluids". All of these patent publications are incorporated by reference in their entireties as the present invention pertains to improvements upon these contaminant adsorbent technologies.

BRIEF SUMMARY OF THE INVENTION

A contaminant adsorption material is provided that may include a self-assembled monolayers on mesoporous supports (SAMMS) that is fixed in place on a lattice support structure such as but not limited to sintered metal wire mesh. Individual wire fibers of the sintered wire mesh may have a film coating or other such coating of mesoporous material that is functionalized for a target metal. The mesh material is formed into filtration elements with or without particulate filtration media. Systems employing such filtration elements in one or multiple stages are also disclosed with an optional acid was stripping system for regenerating SAMMS and to facilitate reclamation of contaminants that can be refined into usable commercial materials.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 3 are SEM (scanning electron microscope) images of a 7.5% weight percentage SBA-15 (mesoporous silica film coating) that has been coated on sintered stainless steel metal fiber mesh and calcined at 500° C.;

FIG. 4 are SEM images at different magnification levels of a 12% by weight of an SH-modified SBA-15 (mesoporous silica film coating) on sintered metal fiber that has been formed through extraction;

FIG. 5 are different SEM images at different magnification levels of a 12% by weight of ZSM-5 (mesoporous zeolite crystals) that are deposited on sintered metal mesh fibers that has been calcined at 500° C.;

FIG. 6 are SEM images at various magnifications of an SBA-15 mesoporous material powder coating on wires of a metal grid structure;

FIG. 7 are SEM images at different magnification levels of a 6 gram/dm$^2$ of a MCM-41 powder coating on wires of a metal grid structure;

FIG. 8 are SEM images taken at various magnification levels of a 5 g/dm$^2$ of MCM-41 powder coating on woven metal wires;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

According to embodiments of the present invention, contaminant adsorbent material is affixed in a lattice structure that provide open pores through which fluid can readily flow and which may control fluid flow rates, fluid pressures, pressure drops and other flow characteristics for contaminant removal. The lattice structures are configured into filter elements for contaminant adsorbent filtration reactors as a part of filtration systems. An exemplary contaminant adsorbent material used according to embodiments is preferably a nano-adsorbent material manufactured from self-assembled monolayers on mesoporous supports (SAMMS).

Figure 1:
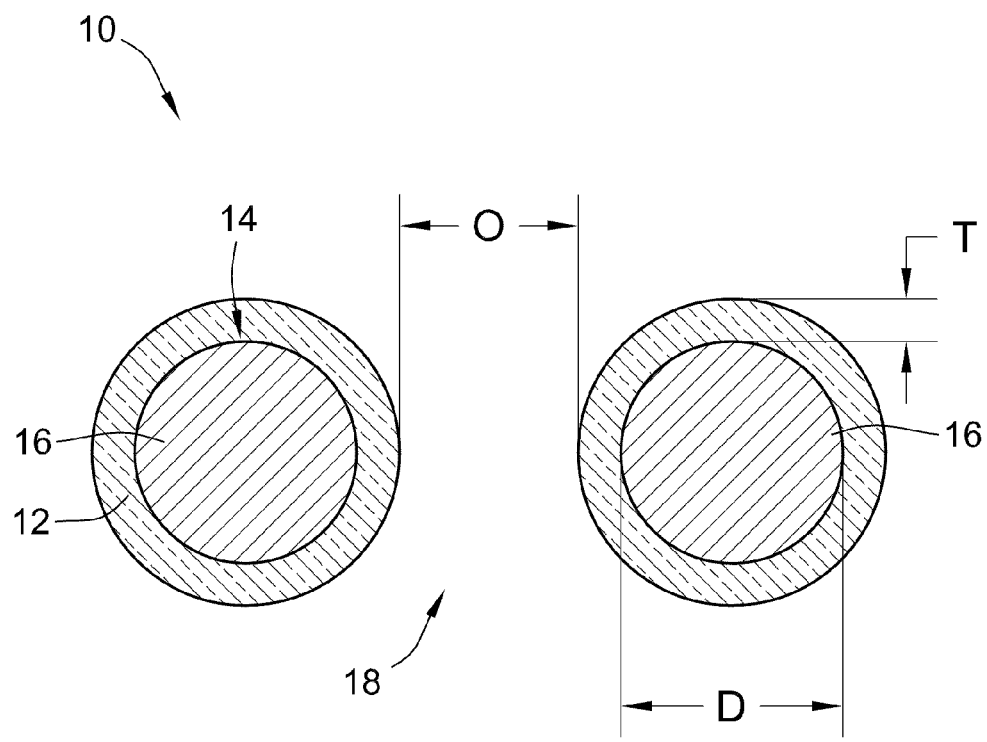
FIG. 1 is a demonstrative and simplified schematic cross-sectional illustration of two SAMMS coated wires of a lattice structure in accordance with an embodiment of the present invention.

Referring to FIG. 1, a schematic cross sectional illustration provides a general overview of a small portion of a lattice structure 10. For example, FIG. 1 may be considered an idealized schematic of two individually coated and functionalized wires, that maybe for example two sintered metal fibers, woven wire mesh wires, wires of a metal grid structure, or wires of a gauze packing. The lattice structure 10 includes functionalized mesoporous material 12 coated on a suitable lattice support 14 such as stainless steel metal wires 16, which serve as support cores and thereby provide a structural organization and support for the mesoporous material.

The lattice support 14 holds the mesoporous material 12 in place relative to a fluid flow such that channeling and short-circuiting of fluid through an unsecured packed SAMMS particle bed can be avoided. In such industrial filtration applications, a sizeable flow rate can be experienced which can channel and/or otherwise move SAMMS powder particle to create uneven flow through a packed powder bed. For example, flow rates in filtration applications such as embodiments herein may be between about 0.3 and 20 meters/minute, and more typically between about 1 and 5 meters per minute for water or other liquid type fluids; and between about 30 and 900 meters/minute, and more typically between about 100 and 300 meters per minute for gases or other gaseous fluids. By maintaining a fixed network and structuring the SAMMS on the wires, uniform loading of toxic contaminant metals may be achieved throughout the structured bed and fluid flow does not cause displacement of the SAMMS. Instead, the SAMMS is fixed in place and maintained in communication with fluid flow by structured support of the lattice structure 10.

While mesoporous material may be sandwiched between lattice support layers and partially affixed and bonded to the lattice support, the mesoporous material 12 preferably completely surrounds and encapsulates the metal wires 14. Typically the coverage of mesoporous material on the metal wire is at least 50% and preferably greater than 90%-100% to maximize the contaminant adsorbent capacity for a given volume of lattice structure. The coating is most preferably an integral film coating in which the mesoporous material 12 is integrally formed on the lattice support and thereby deposited on the lattice support 14, but may also be deposited in less preferred embodiments by other methods, including powder coating or by adhesive attachment of particles (e.g. with laminated adhesive or by integral attachment of powder particles to a mesoporous film formed on the wires, and/or a combination of integral film and SAMMS powder).

The lattice support 14 has a body with an average thickness D (e.g. diameter or average of length and width) that is generally considered to be non-porous in the fluid flow sense. While individual wires may not be porous, collectively the metal wires and lattice support 14 is preferably substantially porous (as identified by pore gap opening O) even after coating with the mesoporous material 12 to readily allow for open fluid flow into the lattice support 14 and more preferably through the lattice support. For example, pore size or gaps (after coating) identified by O for the macropores 18 in FIG. 1 can have an average pore size or distance between adjacent wire fibers on the micron level that may be of between about 1 micron and about 2500 micron to facilitate fluid flow for contaminant adsorbent filtration applications, and more preferably between 3 and 400 micron.

Another useful measure is porosity of the lattice support, both before and after coating. Porosity is particularly a more useful measure in depth filtration media and in non-woven materials such as sintered metal fibers where pore sizes are not structured in an organized predefined pattern (pore sizes are not uniform and irregular in shape and size). The porosity may be measured in terms of a single layer of material, or may also be measured in terms of multiple stacked layers of material in which additional gaps (that can be expanded through corrugation or other shaping). Preferably, the porosity of a lattice structure is preferably greater than 50% after coating (e.g. at least 50% of the volume is void space to facilitate fluid flow). For example, for a single layer of sintered metal fibers, the porosity before mesoporous coating is preferably 70%-90%, and preferably between 60-80% after coating.

As demonstrated by some of the embodiments below, the metal wires may preferably take the form of woven wire mesh, wire gauze packing, and sintered metal fibers. The term "wire" herein is thus meant to be broad to encompass fibers, filaments and other strands of structures. The lattice support and wires provided thereby may also be formed of other such materials as glass fibers (e.g. glass fiber filter material), polymeric fibers, teflon fibers, or other suitable lattice structure material. A preferred material is stainless steel metal wire fibers in the form of sintered stainless steel wire fibers. Other preferred materials include a woven wire mesh and a gauze packing. A thinner coating of SAMMS material may be accomplished on thinner wires such as sintered metal fibers, while a thicker coating is employed on thicker wires such may be employed in woven wire mesh, wire grid structures and gauze embodiments.

The mesoporous material 12 that can be used in connection with the present invention is thiol-SAMMS, such as that disclosed in U.S. Pat. No. 6,326,326, the entire disclosure of which is hereby incorporated by reference. It comprises a suitable mesoporous material such as silica (or alumina, zeolite or other suitable mesoporous material), that is functionalized along its outer surface with functional molecules to provide a desired contaminant adsorbent property. For example, functionalizing the mesoporous material with a thiol group provides for mercury adsorbent properties. Other functional molecules may be used in the alternative and/or in combination to provide for different contaminant adsorbent properties, which may include but are not limited to a thiol, an amine, a thioalkoxide, polycarboxylic acids, ethylenediamine, bipyridyl, phenanthroline, phenols, polyhydroxyaromatic, carbonyl compounds, phosphine, phosphine oxide, isonitrile and combinations thereof. For example target metals or metal compounds that may be bound include but are not limited to: As, Bi, Cd, Co, Cu, Pb, Hg, Ni, Pt, Ru, Rh, Se, Ag, and combinations thereof.

The mesoporous material 12 is typically a form of a molecule sieve that possesses ordered pores on the submicron level (e.g. pore sizes typically between 2 and 30 nanometers, and more typically 3-4 nanometers in one embodiment), typically with a narrow size distribution, and a high surface area (up to 1200 square meters/g) with an apparent density that may range from about 0.2 grams/milliliter to about 0.4 grams/milliliter. The mesoporous material 12 substantially coats the lattice support 14 such that the functional molecules carried on the surface of the mesoporous material 12 are subjected to and interact with fluid flow and able to adsorb contaminant particles in a fluid stream. However, the flow rate of fluid through a filter element is not controlled by the characteristics of these mesopores. Rather, the mesopores increase functional surface area and ability for functional molecules to act as a contaminant adsorbent. Fluid flow rate through filter element is substantially determined and thereby controlled by the arrangement of the lattice structure and/or the pore size and porosity of the lattice structure.

The coating of mesoporous material 12 on the wires 16 has an average thickness T that may preferably be between about 5% and 50% of the thickness D of the wires 16. Preferably, the average thickness T is less than the typical average diameter of commercially available SAMMS powders such as are available from Steward Environmental Solutions, LLC of Chattanooga, Tenn. Embodiments of the present invention herein afford adequate fluid flow and prevent compaction or powders by way of the larger micron sized macropores 18 present in the coated lattice structure 10. Additionally, smaller mesoporous material thickness T is believed to maximize the contaminant adsorbent effectiveness of the functionalized SAMMS, as fluids or toxic heavy metal contaminant may not effectively reach the entire depth of too thick of SAMMS material. Maximum practical effective thickness for purpose of contaminant adsorption is believed to be between 20 and 50 micron; and believed to be typically less than about 30 micron. Thinner mesoporous layer thickness may result in other substantial benefits such as faster kinetics and more efficient adsorption for toxic heavy metals and less residence time necessary for contaminant adsorption or for acid wash stripping of toxic heavy metals.

Additionally, such thinner mesoporous material layers is conducive a more open material and to larger pore sizes O and thereby more conducive to fluid flow. Actual thickness will depend upon the type of lattice support material selected, with examples provided herein. Preferably, for sintered metal wire fibers (e.g. preferred wire diameter/thickness T of between about 1 micron to about 30 micron), the coating thickness T of mesoporous material 12 can be between about 1 micron and about 20 micron, with more preferably a coating thickness of between about 1 and about 2 micron.

Certain embodiments of the present invention may also achieve greater available surface area of SAMMS relative to SAMMS powder materials. For example, a 1 micron thick SAMMS film coating on a 12 micron stainless steel sintered metal fiber mesh has a calculated SAMMS surface area of 24,000 square feet/cubic foot. In contrast, a 50 micron SAMMS powder packed bed has a calculated surface area of 4125 square feet/cubic foot. The calculations can be made with the following equations:

$$S = (4/Df)(1-\epsilon) \quad Df = \text{fiber dia.} \quad \epsilon = \text{void fraction}$$

$$S = (6/Dp)((1-\epsilon) \quad Dp = \text{particle diameter}$$

Preferably, embodiments of the present invention have a calculated surface area of greater than 5,000 square feet/cubic foot, more preferably greater than 10,000 square feet/cubic foot, and even more preferably greater than 15,000 or 20,000 square feet/cubic foot. At the same time the porosity can be maintained for fluid flow (e.g. greater than 50% after coating, and more preferably between 60% and 80% or higher after coating).

For other thicker metal wires (e.g. woven wire mesh, wire gauze and/or perforated plate embodiments), the coating thickness T of mesoporous material 12 may thicker than that employed on sintered metal fiber material. For such other thicker metal wires (e.g. woven wire mesh and wire gauze or perforated plate), the coating thickness T of mesoporous material 12 be between about 5 micron and 100 micron and more preferably between about 10 and about 50 micron. The coating thickness T of mesoporous material 12 may be between about 5% and 30% of the thickness D of the thicker metal wire material chosen.

Preparation of a functionalized lattice structure can be performed in various steps. First a lattice structure 14 such as a suitable wire mesh material, wire gauze and/or perforated metal is selected for a given filtration application and fluid flow characteristic based on the anticipated contaminated adsorbent filter element into which it will be or is constructed and desired SAMMS coating properties. Typically, the thickness of a layer or sheet the lattice structure (not including thickness attributable to corrugating or pleating) is typically greater than about 2 mil (or about 50 micron). For example, sintered metal fiber mesh may have a thickness of between about 2 mil (or about 50 micron) and about 12 mil (or about 300 micron). Thicker lattice structures such as perforated plate and/or wovens may be greater than 300 micron in thickness.

The filter element may be at least partially formed prior to coating and functionalizing or after coating and functionalizing. It has been found that at least the film coating examples allow sintered wire fiber mesh that are coated to be subject to further forming, processing and handling. As such, the lattice structure may not need to be preformed into a filter element. At least partial corrugating, shaping or preforming before hand may however prevent loss of SAMMS coating. Additionally, as indicating in the examples, a powder coating on wires is less susceptible to further processing as the coating tends to crack off when handled. At least partial corrugating, shaping or preforming the wire lattice substrate into the desired filter element shape prior to powder coating can be done.

After selection and shaping if any (pleating, corrugating or other forming) of the lattice structure mesoporous material 12 can be affixed preferably as a film coating on the lattice support 14. One commercially available source for securing a film coating on metal wire is the Institute of Chemical Engineering and/or the Swiss Federal Institute of Technology located in Lausanne, Switzerland. For example, the following publications from Lausanne, Switzerland set forth methodology for forming a mesoporous coating on a metal material substrate, the entire disclosures of which are hereby incorporated by reference: I. Yuranov et al., *Structured Combustion Catalysts Based on Sintered Metal Fibre Filters*, IChemE, Pgs. 217-227 Vol. 43 No. 3 ISSN: 0926-3373 (Jul. 10, 2003); B. Louis et al., *Synthesis and Characterization of MCM-41 Coatings on Stainless Steel Grids*, IChemE, IIT Madras and IAEM, Pgs. 159-163 Catalysis Communications 3 (2002); I. Yuranov et al., *Pd/SiO$_2$ Catalysts: Synthesis of Pd Nanoparticles With the Controlled Size in Mesoporous Silicas*, Swiss Federal Institute of Technology, Pgs. 239-251 Vol. 192 No. 1-2 ISSN: 1381-1169 (Feb. 3, 2003); C. Horny et al., *Microstructured string-reactor for Autothermal Production of Hydrogen*, Chemical Engineering Journal 101, Pgs. 3-9 (2004); L. Kiwi-Minsker et al., *Microstructured Reactors for Catalytic Reactions*, IChemE, Pgs. 2-14 Vol. 110 No. 1-2 ISSN: 0920-5861 (Dec. 15, 2005).

For example, one suitable process as described in I. Yuranov et al., *Structured Combustion Catalysts Based on Sintered Metal Fibre Filters*, IChemE, Pgs. 217-227 Vol. 43 No. 3 ISSN: 0926-3373 (Jul. 10, 2003) sets forth the following methodology which may be employed:

The sol-gel solvent evaporation method [10,11] was employed for the synthesis of silica, alumina and mesoporous SBA-15 films. A Vycor-type porous glass layer was prepared via deposition of the precursors of sodium borosilicate glass components on the fibre surface followed by their melting and acid treatment [12-14]. As it is known, the melt of sodium borosilicate glass, when cooled below its liquidus temperature, separates into two intertwined phases: a phase soluble in strong mineral acids and an insoluble one. Acid treatment of the phase-separated glass removes the soluble phase resulting in a porous (d=1-5 nm) silica-enriched glass In a typical SiO$_2$ coating preparation, 5 ml of H$_2$O and 5 ml of concentrated HCl were added into the solution of 20 g of tetraethoxysilane (TEOS) in 30 ml of ethanol with stirring for 2 h at 70° C. The MFF were impregnated with this solution, dried at room temperature for 14 h, and calcined in air at 450° C. (2 h). The SiO$_2$ content was determined gravimetrically to be 5.0 wt. % . . . .

In the Vycor-type porous glass (PG) coating preparation, the precursors of the sodium borosilicate glass components were deposited onto the MFF filters via impregnation. Two solutions of the precursors were used for this purpose: (a) a mixture of 10 ml of colloidal silica (40 wt. %) and 90 ml of H$_2$O and (b) a solution of Na$_2$B$_4$O$_7$.10H$_2$O (12.3 g) and B(OH)$_3$ (3.65 g) in H$_2$O (100 ml). The MMF were impregnated with the first solution and dried at room temperature for 14 h and subsequently at 100° C. for 2 h. The impregnation and drying operations were repeated using the second solution. The MMF were heated in air at 800° C. for 2 h to create glass (7 wt. % Na$_2$O+23 wt. % B$_2$O$_3$+70 wt. % SiO2) film on the metal fibre surface with a content of 7.5 wt. %. The glass film was treated in HCl (3 wt. %) at 80° C. for 1 h, rinsed and dried in air at room temperature.

Thereafter, functionalizing the mesoporous material deposited on the lattice support structure is accomplished. One source for functionalizing mesoporous material for contaminant adsorption (such as for example to form thiol-SAMMS) is Steward Environmental Solutions, LLC of Chattanooga, Tenn. Generally, functionalizing the mesoporous material can be accomplished according to U.S. Pat. No. 6,326,326, the disclosure of which has previously been incorporated by reference.

Examples of Lattice Structures that can be Coated with Mesoporous Material

Figure 2A:
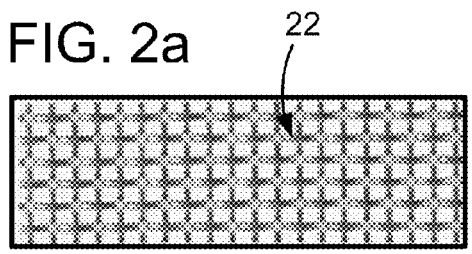
FIG. 2a is an illustration of a lattice structure in the form of woven wire mesh having a classical weave which may be coated with SAMMS in accordance with an embodiment of the present invention.
Figure 2B:
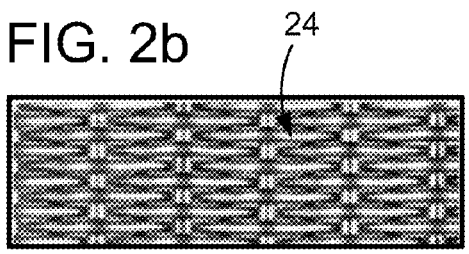
FIG. 2b is another example of a lattice structure in the form of woven metal wire mesh having a Dutch weave that may be coated with SAMMS material in accordance with an embodiment of the present invention.
Figure 2C:
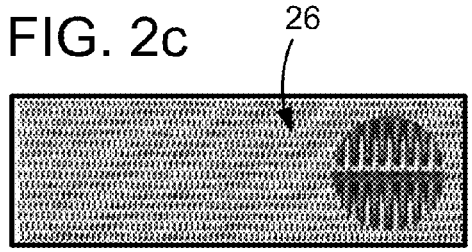
FIG. 2c is another example of a lattice structure in the form of woven metal wire mesh having a multi-pore weave which may be coated with SAMMS material in accordance with an embodiment of the present invention.
Figure 2D:
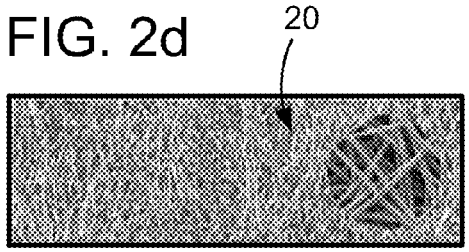
FIG. 2d is an illustration of a lattice structure in the form of sintered wire mesh having sintered metal fibers which may be coated with SAMMS material in accordance with an embodiment of the present invention.

Turning to FIG. 2a-2i, examples of various lattice structures are illustrated. A preferred form of a lattice support structure is shown in FIG. 2d as stainless steel sintered metal fiber mesh (see also example mesoporous silica coated sintered fibers SEM images at FIG. 3). This type of media is typically a depth type filtration media that loads particulates throughout the depth of the media. The uncoated wires of the metal fiber mesh may have a overall layer thickness of between about 2 and about 12 mils, a porosity of between about 80% and about 90%, a wire diameter and thickness D (FIG. 1) of between about 1 micron to about 30 micron to support a mesoporous coating of SAMMS of between about 1 micron and 20 micron and more preferably between about 1 and 2 micron. The parameters are chosen relative to provide desired flow rates and available contaminant adsorption surface area.

Given the small size and irregular size of the pores in this sintered metal fiber mesh, the media is prone to depth filtration of particulates, not just contaminant adsorption by way of the SAMMS coating. Particulates having a size of greater than about 5 micron (and potentially 1-5 micron sized particles) may be subject to depth filtration throughout this type of media. To prevent particulate depth filtration loading which could inhibit, an embodiment using this media or lattice structure that tends to load with particulates may employ in combination a pre-filter (e.g. see prefilter 126 in FIG. 10) either in the same element or more preferably in a separate upstream particulate filtration element (either surface loading barrier filtration or depth loading filtration or a combination thereof). In particular, when using a depth loading type stainless steel sintered metal fiber mesh, a prefilter may be advantageous to prevent plugging of the contaminant adsorption capabilities of SAMMS coated wire mesh. A prefilter should have an absolute efficiency rating (e.g. greater than 90%) for the standard operating fluid flow rate of an application of between about 0.2 micron and about 5 micron, and more preferably at least a 1 micron efficiency prefilter or better. Not only wires may be employed for a lattice support structure. For example, FIG. 2g is an illustration of another depth loading lattice structure in the form of sintered metal particles 21, which similarly may be coated with SAMMS material in accordance with an embodiment of the present invention.

FIGS. 2a, 2b, and 2c illustrate various different embodiments of woven wire mesh materials that may form a lattice structure for coating with SAMMS. Examples include but are not limited to a classical weave woven wire mesh 22, a Dutch woven wire mesh 24, and a multi-pore weave woven wire mesh 26. These embodiments have defined and organized pore structures defined between wires and can be defined by wire thickness and/or pore size (e.g. mesh size). As such, these are more typically of a barrier or surface loading characteristic that can be less prone to plugging than a depth loading type media. As such, prefilters are more optional when these types of mesh materials are chosen as a substrate. Rather than using prefilters, periodic reverse pulsing and/or fluid backflushing can unplug a significant amount particulates captured with this type of lattice structure. Each of woven wire mesh lattice supports may be coated with SAMMS in accordance with an embodiment of the present invention. Wire gauze packing another thicker type of material that may also similarly be coated with SAMMS material. Further, FIG. 2f is an illustration of a lattice structure in the form of wedge wire 28 media that may be wound, wrapped or otherwise arranged in a lattice structure and coated with SAMMS materials in accordance with an embodiment of the present invention. In these thicker wire embodiments, the wire diameter (a.k.a. average width) may be between about 4 mil and about 12 mil (e.g. between about 100 and 300 micron), with an average layer thickness of between about 4 mil (one wire thick) and about 3/16th of an inch. Preferably, a thicker SAMMS coating (preferably a film coating) is employed on these thicker wire embodiments, but preferably less thick than typical SAMMS powder particle size. To maximize practical and effective contaminant adsorption surface area, embodiments may include a SAMMS coating thickness of between about 10 and about 40 micron, preferably less than 30 micron (most preferably between about 20 and about 25 micron).

Figure 2E:
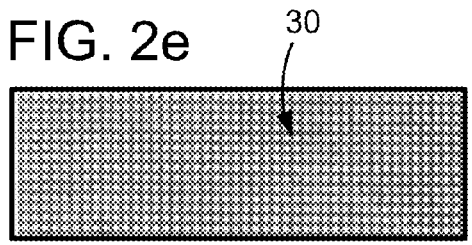
FIG. 2e is an illustration of a lattice structure in the form of a micro-perforated sheet which may be coated with SAMMS material in accordance with an embodiment of the present invention.
Figure 2F:
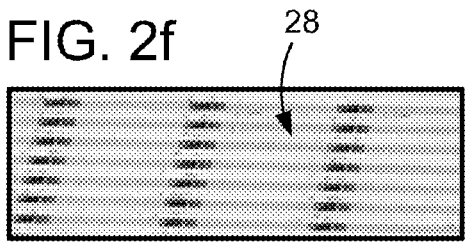
FIG. 2f is an illustration of a lattice structure in the form of wedge wire media that may be wound, wrapped or otherwise arranged in a lattice structure and coated with SAMMS materials in accordance with an embodiment of the present invention.
Figure 2G:
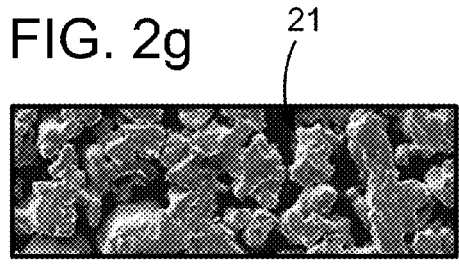
FIG. 2g is an illustration of a lattice structure in the form of sintered metal particles that may be coated with SAMMS material in accordance with an embodiment of the present invention.
Figure 2H:
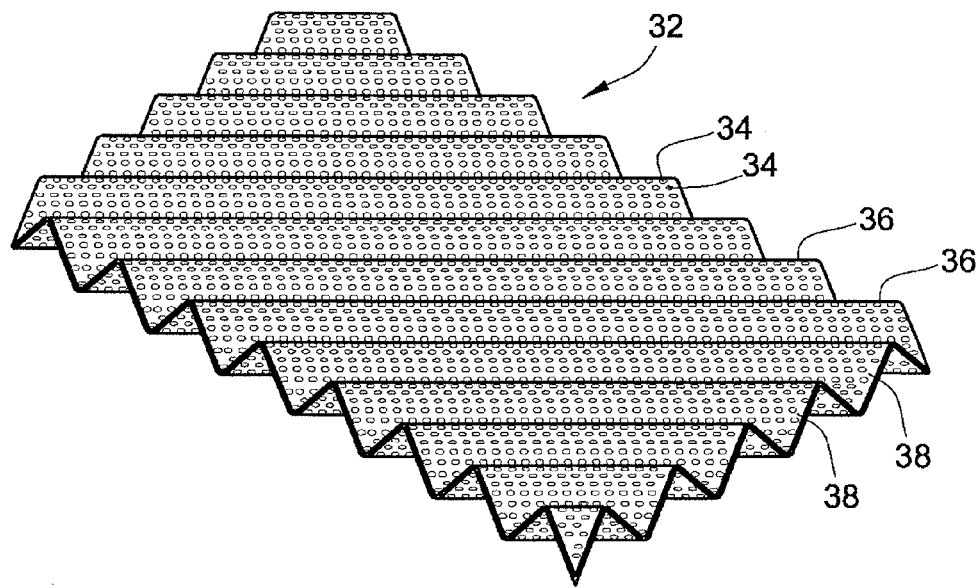
FIGS. 2h and 2i are illustrations of a lattice structure in the form of perforated and corrugated stainless steel sheets of material that may be coated with SAMMS material in accordance with an embodiment of the present invention.
Figure 2I:
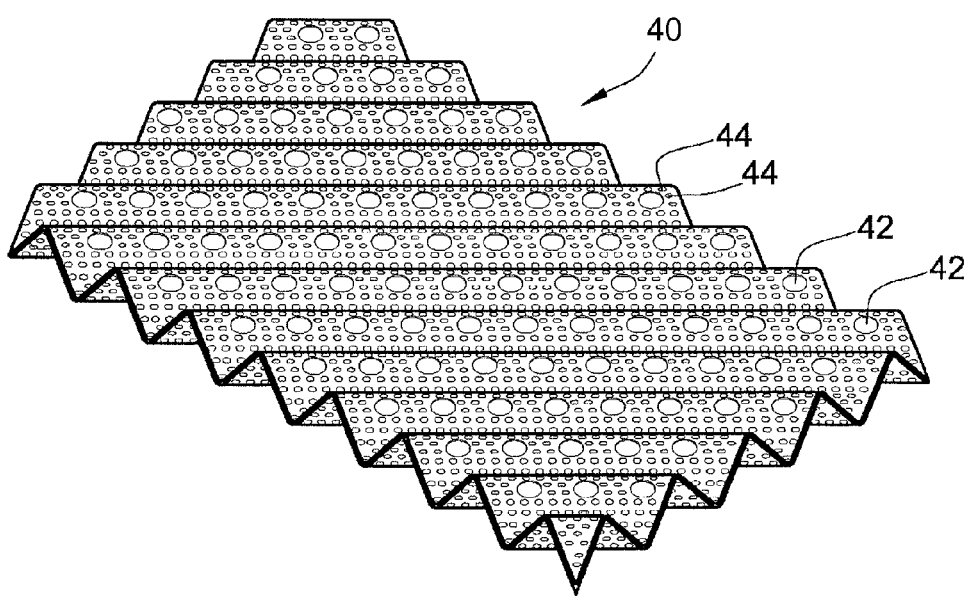

Additionally, FIGS. 2e, 2h and 2i illustrate that perforated materials may be used as a lattice structure that is coated with SAMMS material. FIG. 2e illustrates a flat perforated sheet 30 (e.g. perforated stainless steel) which may be coated with SAMMS material in accordance with an embodiment of the present invention. FIG. 2h illustrates a corrugated perforated sheet 32 including a plurality of perforations providing pores 34. The pores 34 may assist in the anchoring of mesoporous material. Corrugations 36 provide flutes 38 that provide additional flow paths for contaminated fluid flow (in addition to the pores in the lattice structure). Another example in FIG. 2i is a corrugated perforated sheet 40 of metal material having larger pores 42 and smaller pores 44. In one embodiment, the smaller pores 44 may be substantially filled or completely filled with SAMMS and thereby restrictive to fluid flow through the sheet 40, while the larger pores may be only partially filled so that fluid can readily flow through the sheet in addition to flowing along the sheet through the flutes created by corrugation.

Examples of Mesoporous Coated Lattice Structures

Turning to FIGS. 3-7, various scanning electron microscope (SEM) images are presented (at different magnification levels and with micron scales indicated in each figures) of various examples of wire type lattice structures that the present assignee selected and procured mesoporous material coatings by the Swiss Federal Institute of Technology located in Lausanne. At least some of the mesoporous coating methodology employed is believed pursuant to the publications noted above.

EXAMPLE 1

A 12 micron sintered stainless steel fiber mesh (wire thickness of 12 micron), having a porosity of 80% before coating, and a mesh material layer thickness of 4.5 mil was selected for coating with silica material. A 7.5% weight percentage SBA-15 (mesoporous silica film coating) was coated on the stainless steel metal fiber mesh and calcined at 500° C. FIG. 3 are SEM images showing various magnification levels of the media. The pores and porosity of the metal fiber mesh is maintained to allow for fluid flow through the filter media. From the SEM images, it appears that the metal fibers are 100% encapsulated in the mesoporous material, even though it is noted that some cracks appear in the coating. Nanopores may not readily be apparent given the magnification level (e.g. nanopores in the mesoporous material are believed to be 2-4 nanometers is size). The coated mesh material can be handled, cut, bent without causing noticeable dislodging or removable of the coating.

EXAMPLE 2

A 12 micron sintered stainless steel fiber mesh (wire thickness of 12 micron), having a porosity of 80% before coating, and a mesh material layer thickness of 4.5 mil was selected for coating with silica material. A 12% by weight of an SH-modified SBA-15 (mesoporous silica film coating that is modified, that is functionalized for contaminant removal) was coated on sintered metal through an extraction process. Different magnification levels of the resulting coated sintered stainless steel fiber mesh is shown in FIG. 4. Similar observations are made for Example 2 as Example 1. The pores and porosity of the metal fiber mesh is maintained to allow for fluid flow through the filter media. From the SEM images, it appears that the metal fibers are 100% encapsulated in the mesoporous material, although it is noted that some cracks appear in the coating. The coated mesh material can be handled, cut, bent without causing noticeable dislodging or removable of the coating. This example was functionalized (SH-modified) for mercury contaminant removal and was tested to have mercury adsorption benefits.

EXAMPLE 3

In comparison to Examples 1 and 2, a slightly smaller sintered stainless steel fiber mesh (smaller than wire thickness of 12 micron), was selected for coating with mesoporous material. A 12% by weight of a zeolite (ZSM-5 zeolite crystals, SSA around 300 m$^2$) were deposited on centered metal mesh fibers, calcined at 500° C. From the SEM images at FIG. 5, homogeneous nano-pore structures on the surface of each individual wire and the coating materials between the wires. Under high magnification (×10000), it is observed that the wire surface is covered by many nano-rods and additional pore structures are gaps between those nano-sized rods.

EXAMPLES 4, 5 AND 6

A thicker wire material was selected for Examples 4 and 5. For Example 4 (FIG. 6) an SBA-15 mesoporous material was coated on the wire structure with an extraction process. For Example 5 (FIG. 7), a 6 gram/dm$^2$ of a MCM-41 powder was powder coated on the wire structure 1. For Example 6, (FIG. 8), a 5 g/dm$^2$ of MCM-41 was powder coated on woven metal wire structure. For Examples 4, 5 and 6 it is noted that the coating material is subject to shatter in that the powder coating shatters when cut for SEM sample preparation; the coating material for those samples also falls off when touched by hand; and cracks of the coating material can be observed visually. As a result, embodiments of the invention employing this powder methodology may be should be subjected to limited post handling (e.g. filter elements preformed and cut/corrugated/shaped before coating) with the potential arrangement of downstream post particulate filtration to catch particle that may release. As shown in FIG. 6, the coating is not very homogeneous and further pores defined between wires appear to be fully filled with mesoporous material. In some SEM images no metal wire can be observed due to the thick coating layer on top of the metal wire (FIGS. 6a and c). FIGS. 6b and 6d and 6e show the morphology of both coating layer and the metal wire at low magnifications. At high magnification (FIGS. 6f and g), it was observed that the coating material from both the thick coating area and the metal wire surface is all composed of nano-sized particles. The average particle size is about 500 nm (FIG. 6h).

Containment Adsorption Filtration Systems

Figure 9:
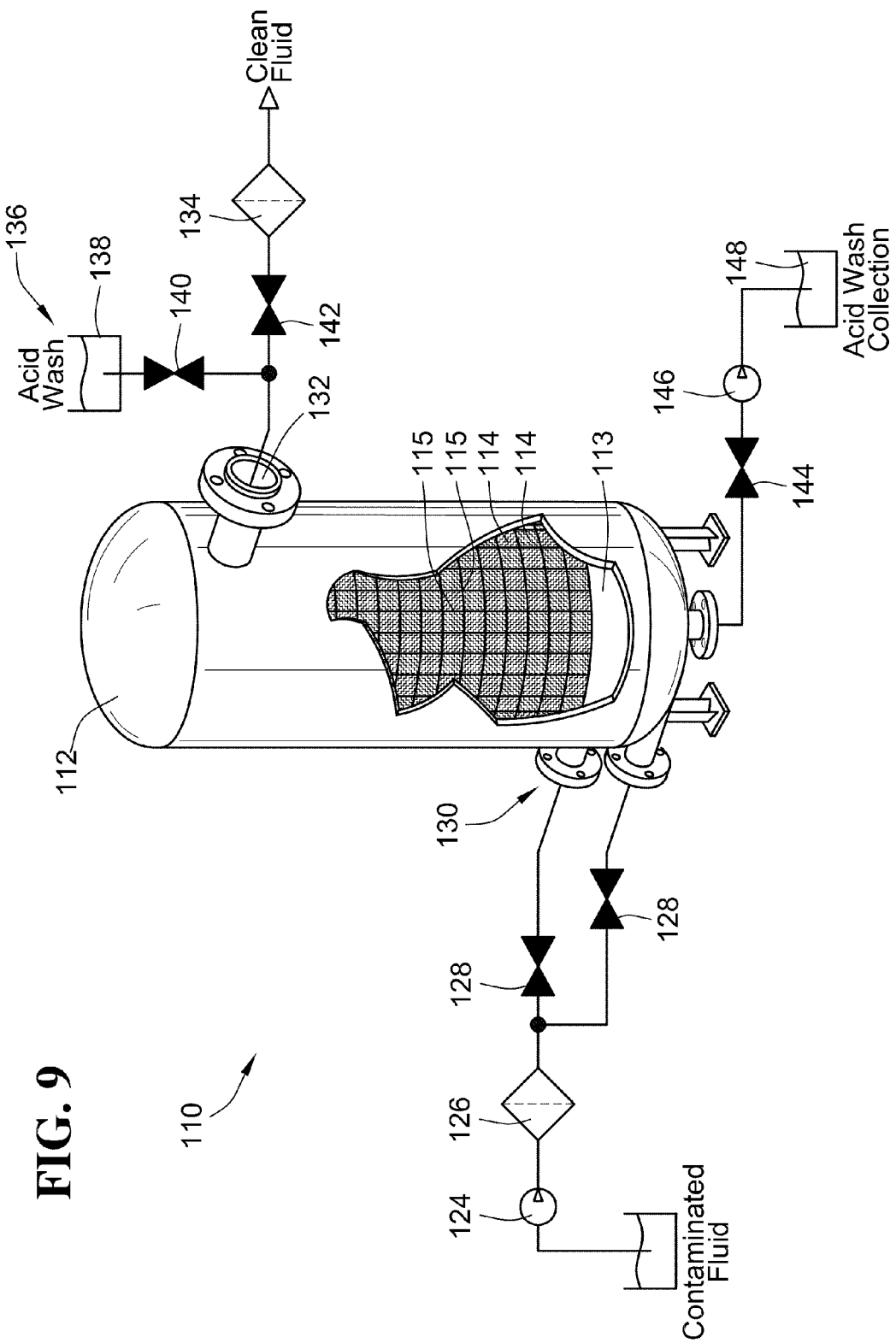
FIG. 9 illustrates a structured bed filtration system utilizing stack bricks providing a lattice structure with waist absorbent material in accordance with one embodiment of the present invention for the use in the treatment of contaminated fluids.

Turning to FIG. 9, an embodiment of the present invention is illustrated as a contaminant adsorption filtration system 110. The system includes a filtration reactor vessel 112 having a filtration chamber 113, in which a plurality of contaminant adsorption filter elements are placed, which take the form of bricks 114. The bricks 114 are stacked both horizontally and vertically with appropriate sealing and spacer structures 115. As a result, fluid flowing from the inlet to the outlet of the filtration reactor vessel 112 must pass in series through a plurality of different bricks 114.

Figure 12:
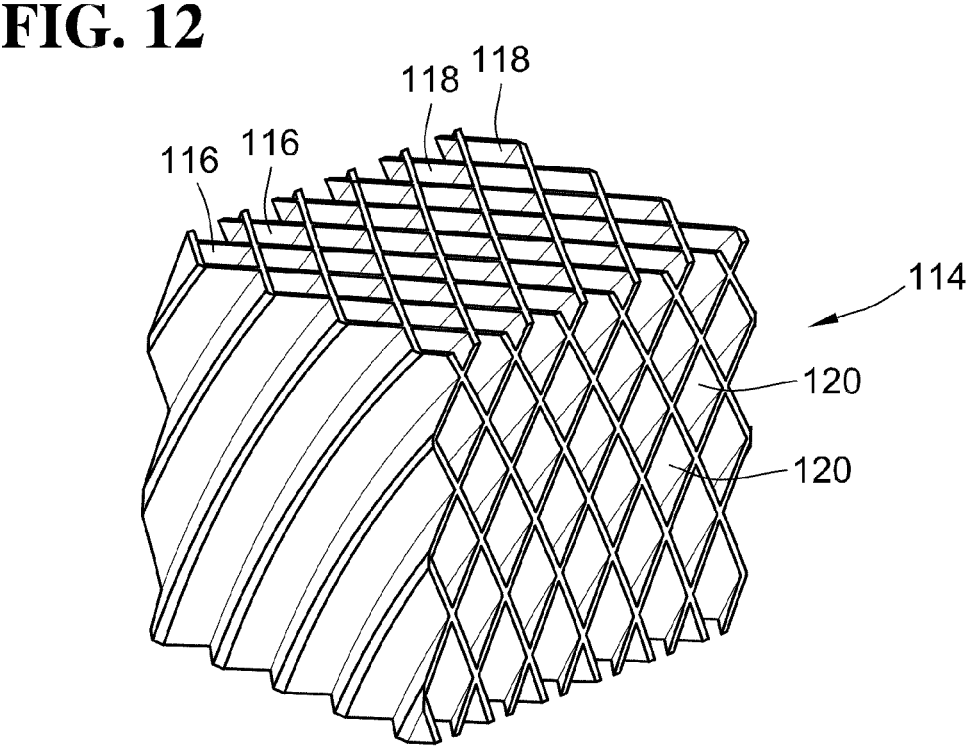
FIG. 12 is an illustration of a brick which may be used in the structured packing bed of FIG. 9.

An example of a brick is shown in FIG. 12 in which corrugated mesh layers/sheets 116 of sintered stainless steel fibers (or other support material as previously discussed) that are coated with SAMMS contaminant adsorbent. The corrugations of the sheets may run in different directions as illustrated so that adjacent corrugate sheets 116 touch at peaks so as to create flow channels 120 running in opposite directions. The depth of the corrugations and hence depth of the flow channels may be between about 3 and about 30 millimeters.

In this embodiment, a pump 124 pumps contaminated fluid (e.g. contaminated fluid such as produced water with a heavy metal such as one or more forms of mercury) from a reservoir 124 through an optional prefilter 126 that is configured to remove particulates that are sized larger that pores in the corrugated mesh layers/sheets 116 of sintered stainless steel fibers to substantially prevent clogging of the porosity of the corrugated mesh layers/sheets 116 of sintered stainless steel fibers (e.g. an absolute efficiency (greater than 90% for operational flow rate) of between 1 and 5 micron for sintered metal fiber mesh. Control valves 128 can control the flow of contaminated fluid into an inlet 130 of the filtration reactor vessel 112. The control valves 128 have fully open, partially open and closed positions and can be manually, electrically or mechanically actuated. Upon entering the inlet 130, contaminated fluid flows through the network of brick 114 flow readily to the channels 120, and entering the macropores of the corrugated mesh layers/sheets 116 where fluid is exposed to micropores of the SAMMS coating thereon for contaminant adsorption of one or more heavy metals. Clean fluid can exit the filtration reactor vessel 112 through an outlet 132 For certain embodiments, an optional post filter 134 may be used to collect any SAMMS particles that may have dislodged from the bricks 114.

Additionally, an acid wash system 136 may be employed in an embodiment for purposes of periodically rejuvenating the contaminant adsorbent properties of the SAMMS coating on the bricks 114. The system 136 includes a reservoir containing a strong acid wash that is normally closed from the system via a system valve during regular operation of the filtration vessel. During an acid wash mode, the reactor vessel 112 is isolated from downstream and upstream connections by closing inlet valves 128 and an outlet valve 142. The acid wash system inlet valve 140 is opened as is a system outlet valve 144 (the system outlet valve 144 may initially be closed to allow a sufficient residence time for the acid wash in the reactor vessel 112 and/or recirculation of acid wash may be employed). The acid wash is then gravitationally fed (or pumped via a pump 146 or other such forced pressure system) into the reactor vessel 112 where it can be allowed sufficient residence time to dissolve and strip the heavy metal contaminants from SAMMS material on the bricks 112. When the system outlet valve 144 is open, the acid wash is then collected in a collection reservoir 148. The acid wash collection in the reservoir 148 may then be processed to generate the previously adsorbed heavy metal. For example, with thiol-SAMMS coated bricks, mercury that has other commercial uses can be refined through processing of the resulting acid wash.

Figure 10:
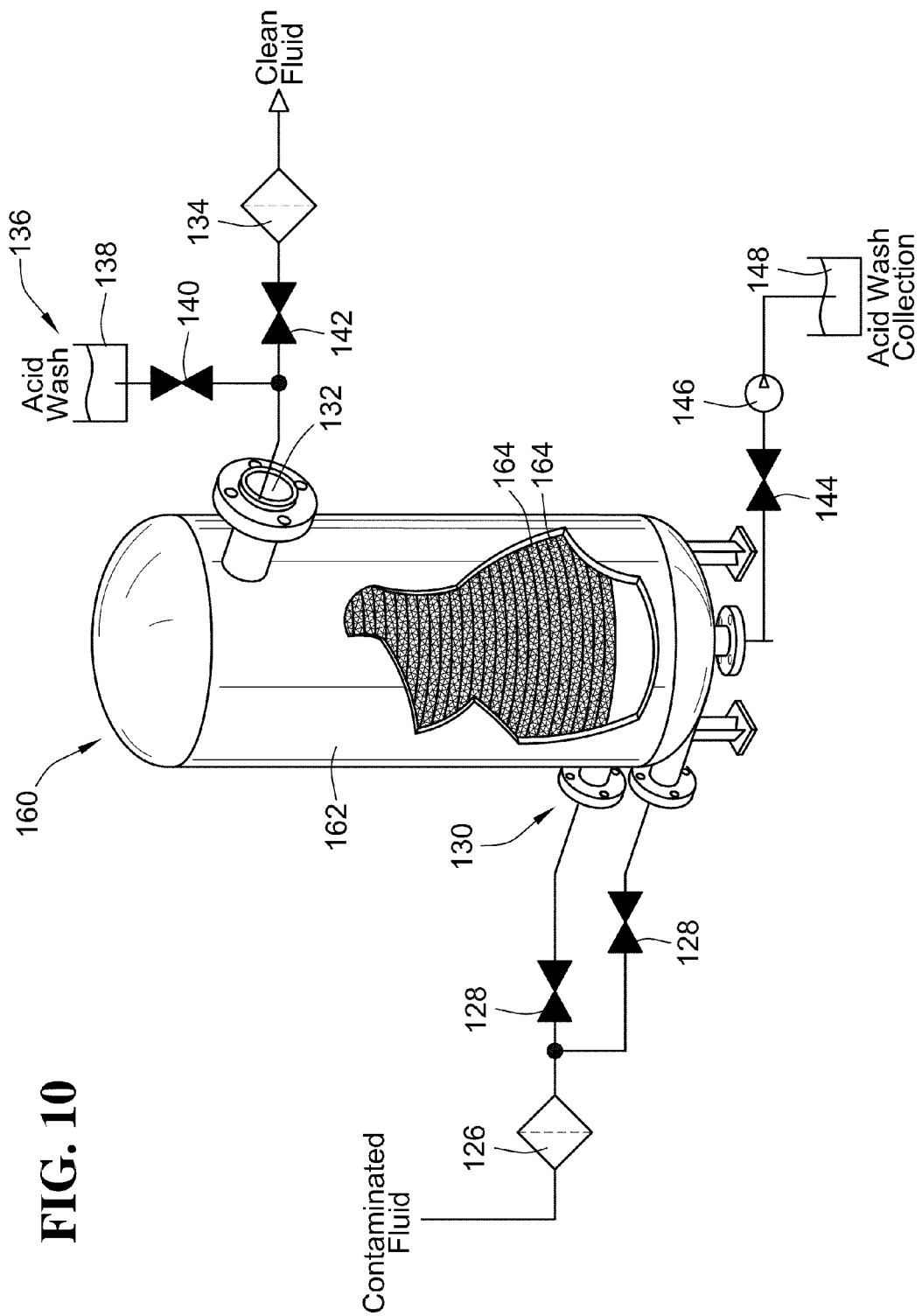
FIG. 10 is a similar structure bed system similar to FIG. 9 except that instead of bricks, stacks of corrugated disks provide lattice structures for support of SAMMS material for use in the treatment of contaminated fluids.
Figure 11:
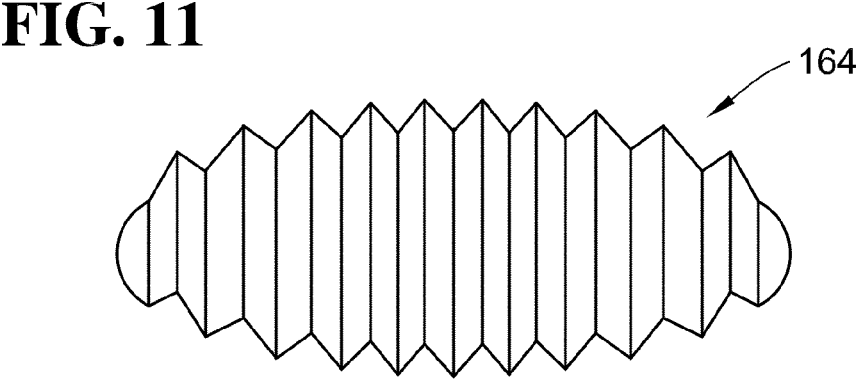
FIG. 11 is an example of a corrugated disk that may be employed in the embodiment of FIG. 10.

FIG. 10 illustrates a contaminant adsorption filtration system 160 similar to FIG. 9 and as such the same reference numbers have been given to common structures. In this embodiment however rather than bricks the filtration reactor 162 employs flat and/or corrugated panels 164 of SAMMS coated lattice structures (e.g. sintered stainless steel metal fibers or other suitable lattice structure). The panels 164 may be stacked so that fluid passes through several layers. FIG. 11 illustrates an example of a corrugated panel 164 in the disc shape that may be employed (other shapes including but not limited to rectangular may be used). The panel may be contained in a solid impermeable border and/or spacer element (not shown) to prevent short circuiting around the periphery of the panel and/or to space adjacent panels.

Figure 13A:
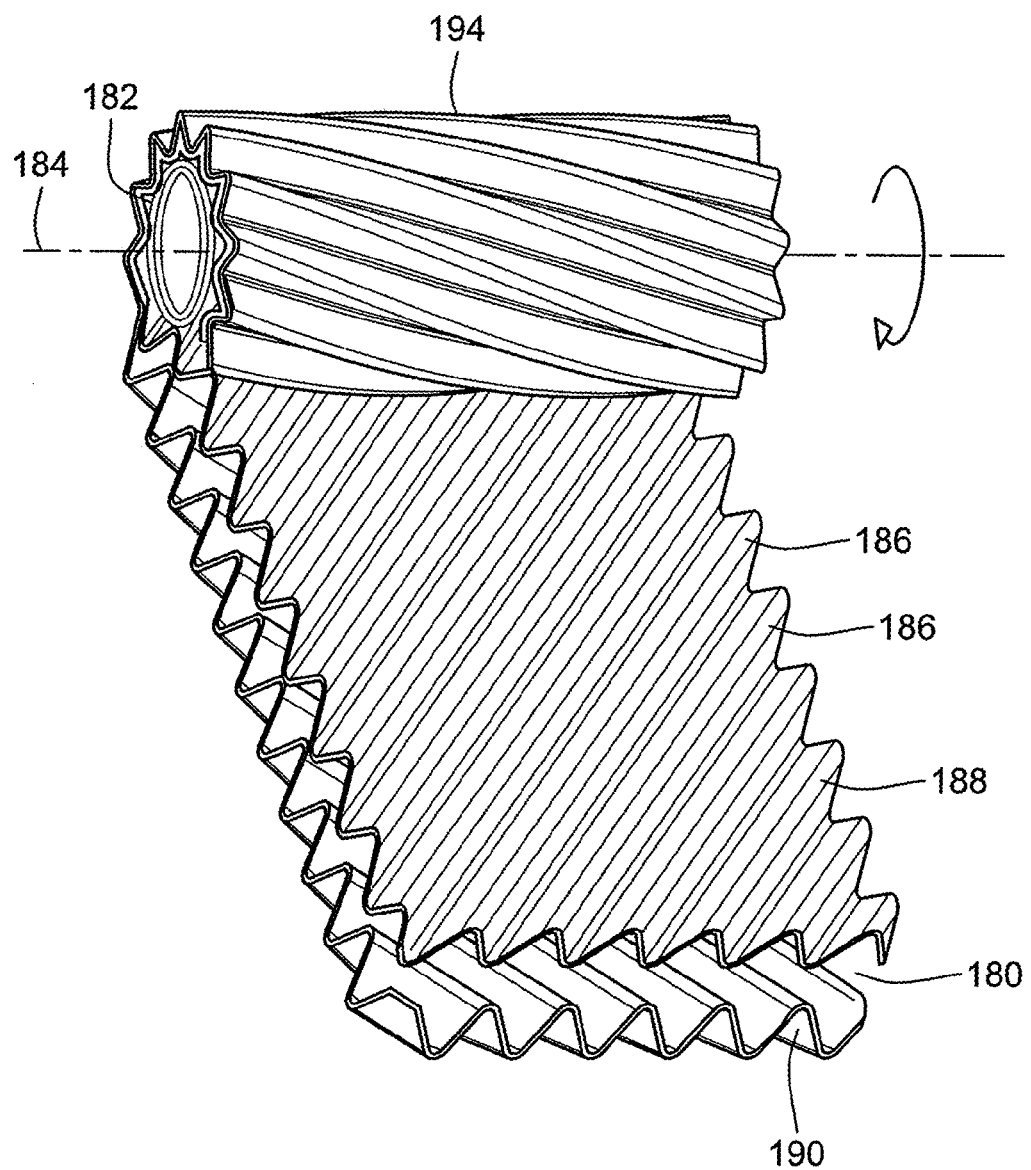
FIG. 13a and FIG. 13b are partly schematic perspective illustrations showing methodology for the winding of a corrugated lattice support structure having a SAMMS coated thereon in a spiral configuration to form a generally cylindrical element.

Other embodiments of the present invention pertain to generally cylindrical filter elements as illustrated, for example in the embodiments of FIGS. 13a, 13b, 14 and 15-16. Referring to FIG. 13a, a corrugated wire mesh 180

Figure 13B:
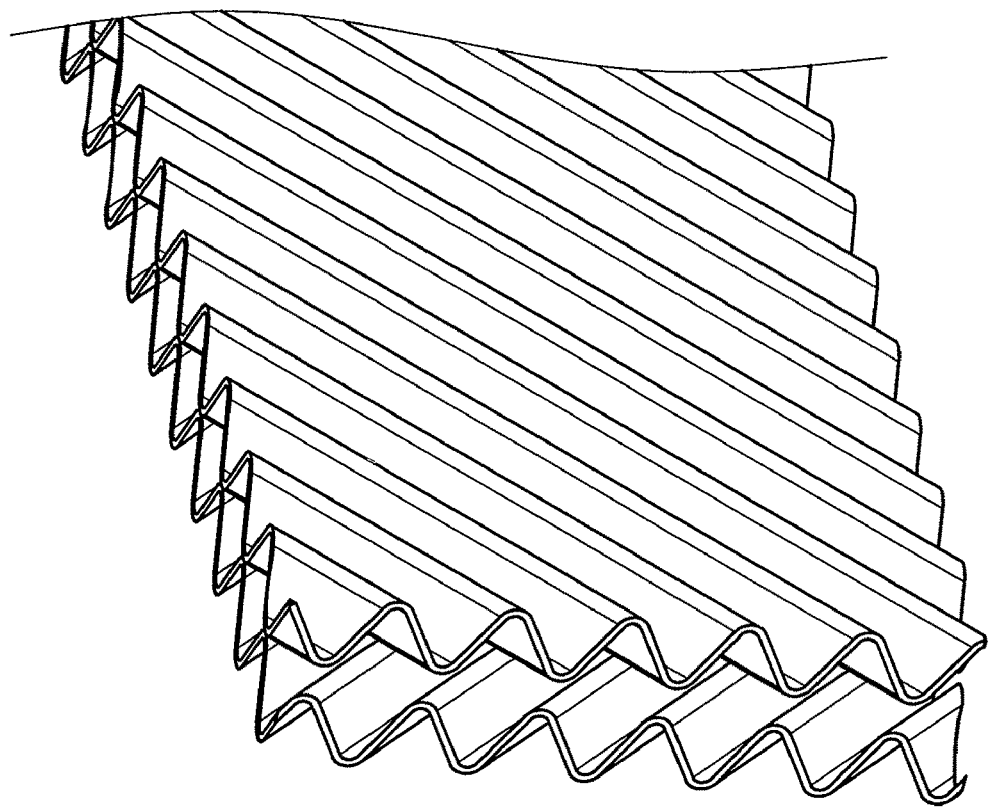

(which may be any of the lattice support structure examples above or other such suitable lattice support structure) is used for making a filter element 178. The corrugated wire mesh 180 is coated with SAMMS material and wound about a perforated support core 182 about a central axis 184 in a spiral configuration. The SAMMS coated corrugated wire mesh 180 is corrugated obliquely relative to the axis 184 with diagonal flutes 186 and is slit along midway along its length in half prior to coiling such that one half can be folded upon the other half to have corrugations in opposing directions on each strip half of material. Alternatively, as shown in FIG. 13*b*, the entire strip of material can be folded in half in a parallel direction to the axis 184 (FIG. 13*a*) prior to coiling (e.g. to maintain same strip width but half as long by folding it upon itself). As a result of either of these configurations, different adjacent folds 188, 190 of the coiled configuration include flutes 186 that extend in opposite directions and thereby provide for open flow channels. Alternatively, if the porosity of the SAMMS coated wire mesh is sufficiently open, corrugations need not be provided; and instead, flat SAMMS coated wire mesh material may simply be wound up in a coiled configuration about the central axis 184. In this embodiment, the length of the corrugated wire mesh 180 extends the axial length of the filter element without interruption.

Figure 14:
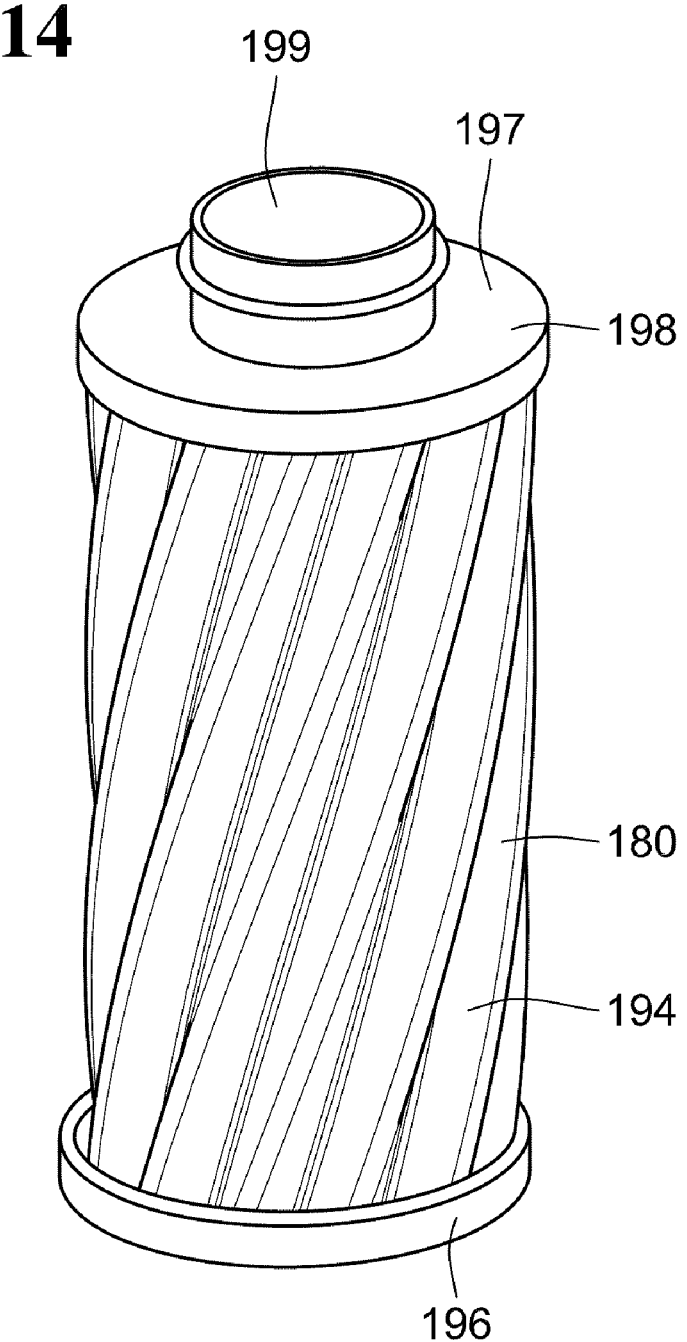
FIG. 14 shows a filter element utilizing the wound material of FIG. 13 with end caps affixed upon either end.

Upon completing the coil configuration, the terminating end portion 192 may be bonded or welded (e.g. resistance bonded) to the outside periphery 194 to hold the corrugated wire mesh 180 in a coiled up configuration and to prevent unraveling from the perforated support core 182. Thereafter, the contaminant absorbent media can be configured into a generally cylindrical filter element 178 as shown in FIG. 14 with a closed end cap 196 sealingly bonded to one end of the corrugated wire mesh 180 and a open end cap 198 having a central inlet or outlet port opening 199 that provides for communication with the inside of the perforated support core 182. The open end cap 198 is sealingly bonded to the other end of the corrugated wire mesh 180. By sealingly bonded it is meant that it is integrally bonded such as by plastic welding as may be the case with plastic end caps or may be potted with plastisol or other adhesive material or otherwise attached with a sealing relationship to prevent short circuiting a fluid around the ends of the corrugated wire mesh. The open end cap 198 may also include an appropriate annular seal 197 to provide for sealing of the filter element when it is installed into an appropriate housing vessel.

In the embodiment shown in FIG. 14, there is only one type of filtration media contained in the filter element 178, namely, SAMMS coated wire mesh media. However, in other embodiments, additional filtration media to include either depth loading and/or barrier/surface loading media (such as cellulous-based filter papers and polymeric or glass-based filtration medias) may also be employed. Additionally, a pre-filter outer wrap or jacket may also be affixed around the outer periphery 194 of the filter element 178 (or in surrounding relation of the core 182 inside of the mesh) such that prior to passing through the SAMMS coated corrugated wire mesh 180 fluid first must flow through a particulate loading filtration media.

Figure 15:
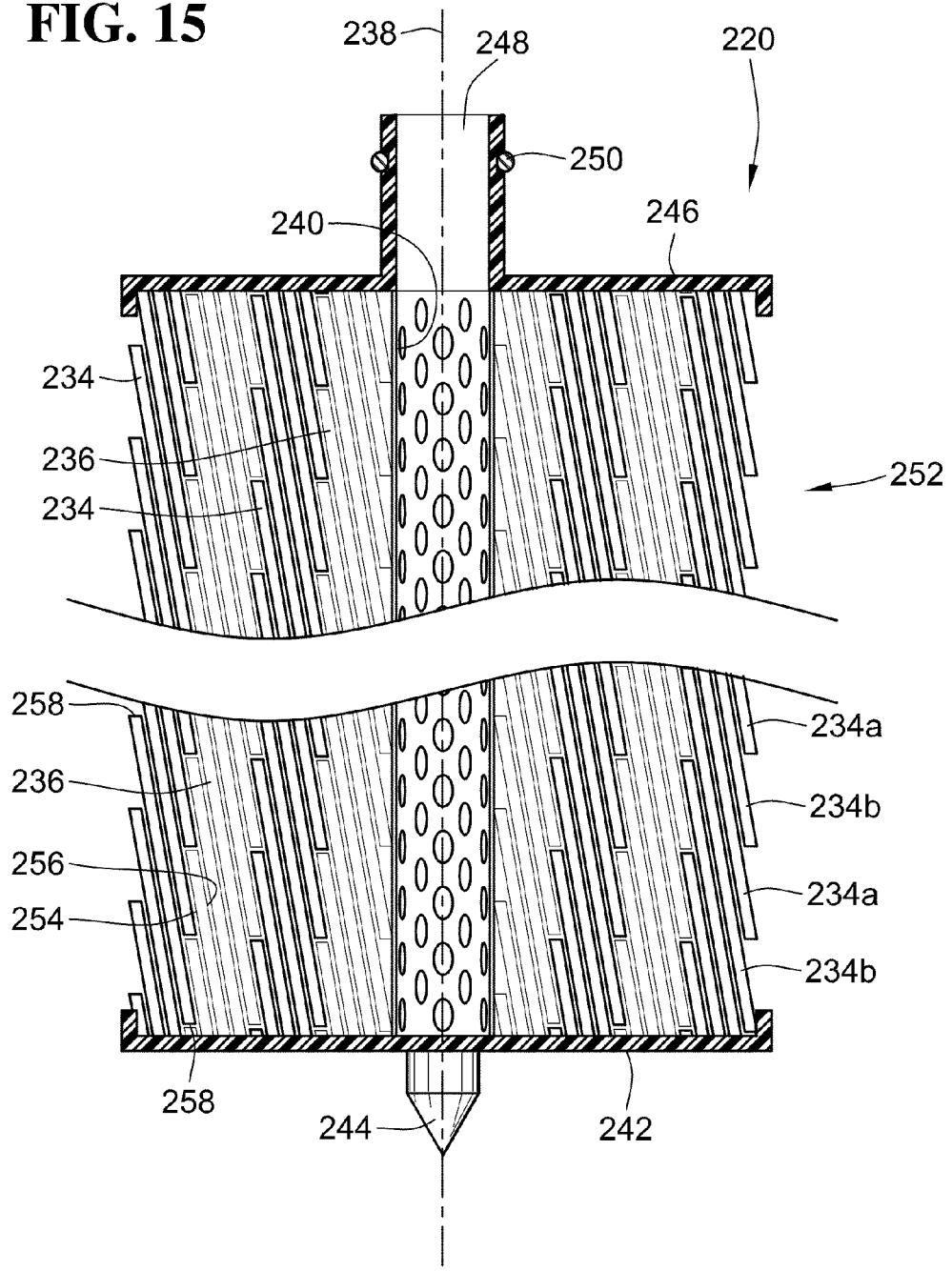
FIG. 15 shows a combination particulate and contaminant absorbent filter element in accordance with an embodiment of the present invention.
Figure 16:
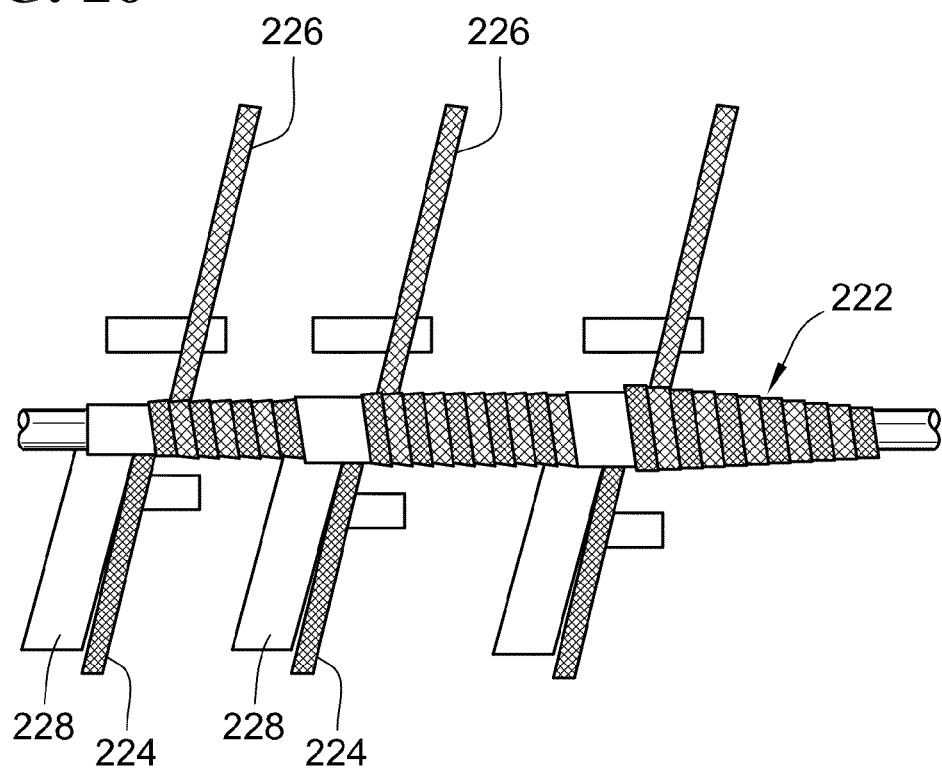
FIG. 16 is a schematic illustration of a helical winding methodology for winding contaminant absorbent lattice structure strips either alone or in combination with other filtration media in accordance with an embodiment of the present invention which may be used to create the embodiment of FIG. 15.

Turning to FIGS. 15 and 16, another generally cylindrical filter element and method for making the same is illustrated in which one or more SAMMS coated wire mesh materials are integrated. For example, one or more strips of SAMMS coated wire mesh media may be wound into helically configured filter media elements. This can be done according to the principles of U.S. Pat. No. 5,893,956 entitled: "Method of Making Filter Element"; and/or pending Patent Application Publication No. 2008/0128364, entitled: "Filter Element and Methods of Manufacturing and Using Same" filed by Dan Cloud and John A. Krogue with a filing date of Dec. 1, 2006; these patent documents are assigned to the present assignee and the entire disclosures of these two patent documents are hereby incorporated by reference in their entireties. These types of filter elements may be built either with or without a central support core core.

Referring to FIG. 16, a multi-overlapped filter media 222 is formed from various multi-overlapped strips 224, 226 and 228 in which each strip 224, 226 and 228 is at least one of the following medias: a depth loading or surface/barrier loading filtration media; a porous spacer element that provides little or no filtration; a SAMMS coated lattice structure; or other suitable media. While only one of the strips may have a SAMMS coating, it is understood that all of the strips 224, 226 and 228 may all be SAMMS coated wire mesh including perhaps two different types of SAMMS coated wire mesh. For example, an embodiment may include a more porous and less porous SAMMS coated wire mesh material. Each strip 224, 226 and 228 of media is spirally or helically wound in overlapping layers to form overlapping bands. Further details as to the methodology for forming such a filter element can be had to the aforementioned U.S. patent publications.

An example of a filter element 220 constructed with this type of winding methodology is illustrated in partial schematic form in FIG. 15. This particular filter element 220 illustrates two different types of helically wound filter media strips 234 and 236 in which at least one of these filter media strips 234 and 236 and perhaps both are of a SAMMS coated wire mesh material. The filter element 220 is a generally cylindrical filter element formed about a central axis and may optionally include a perforated support core 240. A closed end cap 242 with a location support prong 244 is sealingly bonded to one end of the filter media while a open end cap 246 is sealingly bonded to the other end of the filter media. The open end cap 246 provides for a central fluid port 248 that communicates with the inside opening and support core 244 of the filter media and make carry a seal 250 to provide for sealing with a housing vessel when installed therein.

The fluid port 248 may either be an inlet port or an outlet port depending upon the flow configuration. That is, fluid flow may flow radially inward from the outside periphery 252 and into the support core 240 where it may flow axially then toward the fluid port 248. Alternatively, the fluid port 248 may be an inlet port in which unfiltered fluid enters the fluid port 248 and then flows radially outward through the filter media pack toward the outside periphery 252. Because the length of the filter element is longer then any of the individual strips 234, 236, in some embodiments, fluid may flow not only through the filter media strips 234 and 236, it may also flow along the outerwardly and inwardly facing surfaces 254, 256 and around the opposed ends 258. Additionally, interleaving of more porous strips between less porous strips is possible. For example, with reference to filter media strips 234, different types of strips may be interleaved with one another. For example, a less porous strip 234*a* may be interleaved with more porous and open strips 234*b*. This may be particularly advantageous in SAMMS coated wire mesh materials which are loaded with a sizeable amount of SAMMS material to cause fluid flow to flow substantially along the inner and outer surfaces 254 and 256 along a long labyrinth path through the filter media by using interleaved less porous and more porous strips 234*a* and 234*b*. In this instance, the macropores of the mesh allow the fluid to enter the depth of the media and also provide coating surface area for contaminant adsorption, even though much of the flow (in some instances perhaps greater than 50%) is along the face rather than through the individual SAMMS coated mesh strip itself.

As such, it may not be necessary for the strips themselves to facilitate fluid flow through as flow may be accommodate around a SAMMS coated wire mesh strip. Additionally, forming corrugations or pleats to provide for fluid channels may also be employed to increase the overall permanent ability and increase the fluid flow along the outer and inner surfaces and around the ends of the strips.

The embodiment of FIG. 15 may be configured as a contaminant absorption filter element only. In such an embodiment, the filter element may include only SAMMS coated wire mesh strips (e.g. filter media strips 234 and 236 could be different types or the same type of wire mesh material) either alone or in combination with more porous spacer strips that really do not serve a filtration function. Alternatively, the filter element may be configured as a combination contaminant absorption and particulate loading filtration element (with barrier filtration and/or depth filtration loading). More conventional polymeric filter media materials may be wound in combination with SAMMS coated wire mesh material. Different configurations can be employed and the teachings of the U.S. patent publications noted above can be used to create different configurations.

Figure 17:
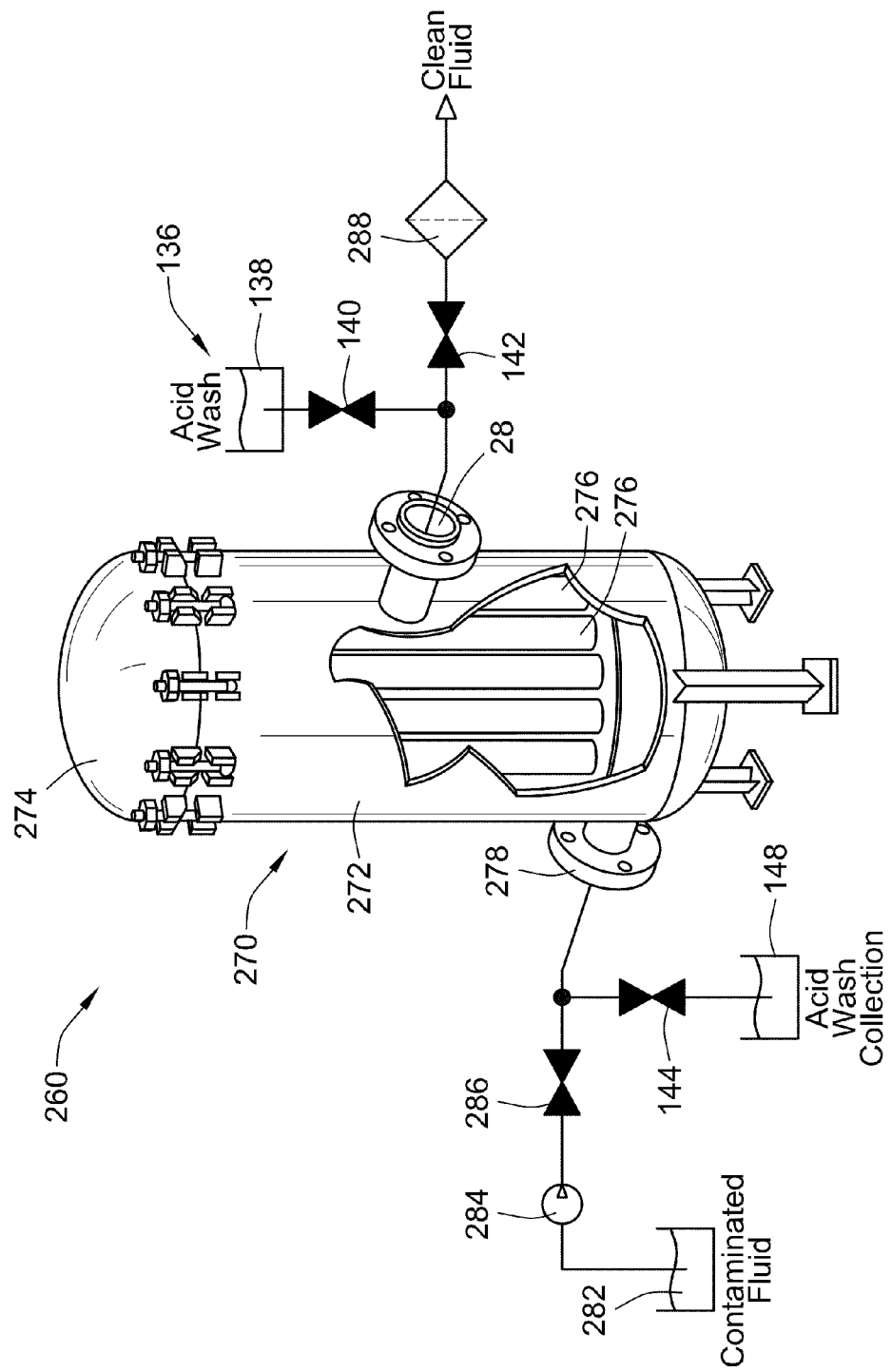
FIG. 17 is a partially cut-away and partially schematic perspective illustration of a one stage filtration vessel having a plurality of cylindrical contaminant absorbent filter elements arranged therein.
Figure 18:
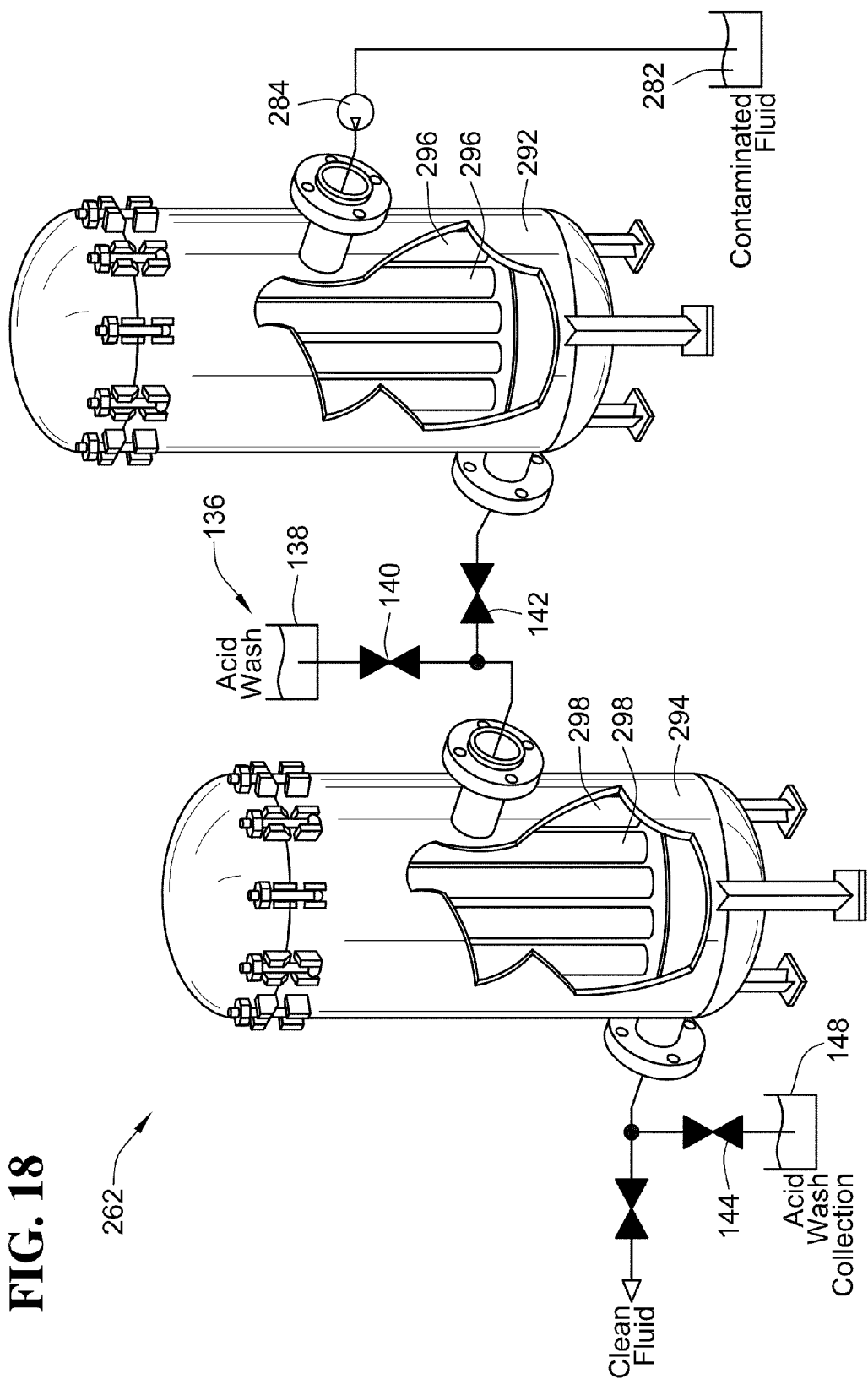
FIG. 18 is a partially cut-away and partially schematic perspective illustration of a two-stage filtration system including a particulate filtration vessel and a contaminant absorbent filtration vessel connected in series in accordance with an embodiment of the present invention.

Turning to FIGS. 17 and 18, two different contaminant absorbent filtration systems 260 and 262 are illustrated. The contaminant absorbent filtration system 260 can be configured as a one stage filtration system wherein the filtration system 262 as shown in FIG. 18 is a two stage filtration system to include a particulate pre-stage filtration vessel. These two embodiments also illustrate that cylindrical filtration elements such as those described in association with FIGS. 13-16 may be employed; and further that fluid may be flowed either radially inward or radially outwardly through such filtration elements depending upon the fluid circuit.

Turning to the contaminant absorbent filtration system 260 of FIG. 17, the filtration housing 270 is illustrated that includes a cup-shaped body 272 and a removable cover 274 that provides for access into the housing for maintenance and replacement of filter elements. Contained within the filter housing are a plurality of generally cylindrical filter elements 276 in which the elements are arranged among themselves in fluid parallel circuit but in between the inlet 278 and outlet 280 of the housing 270. Contaminated fluid from a source 282 may be forced under pressure such as with a pump 284 through a control valve 286 into the housing where it passes through one of the generally cylindrical filter elements 276. From there, clean fluid passes through an outlet 280 and, if desired, an optional downstream filter 288 that may be employed in filtration element embodiments where SAMMS material may be subject to eroding or otherwise dislodging from the filter elements 276. It is believed, however, that such a downstream post-filtration filter 288 may not be necessary in most embodiments; and further, the filter elements 276 may also include adequate barrier filtration along the outlet surface thereof to contain SAMMS particulates that may be dislodged or released.

In this embodiment, preferably the filter elements 276 include a combination of contaminant absorption wire mesh media and at least one of a depth floating and/or barrier/surface loading type filtration media. As a result, contaminated fluid that contains both sediments or other particulates as well as dissolved toxic heavy metals can be removed in a single stage together. As a result, periodically the filtration elements 276 can be removed and replaced when sufficiently loaded with particulates and/or contaminated contaminant. Such filtration element can then be subject to further processing where the captured heavy metals may be collected and refined (e.g. through an incineration process, for example). However, it is also possible, particularly for contaminated fluid that does not contain large amounts of particulates or sediments to employ filter elements 276 which are configured for performing primarily contaminant absorption. For example, the filter elements 276 may employ only contaminant absorption filtration media such as SAMMS coated wire mesh and not employ separate depth loading or barrier/surface loading filtration media.

Turning to FIG. 18, a two-stage contaminant absorption filtration system 262 is illustrated. This embodiment includes two filtration housing 292 and 294 for performing two stages of filtration separation including a first stage and housing 292 of sediment and other particulate removal by way of depth loading and/or surface loading media and a second stage and housing 294 for contaminant absorption. Housing 292 contains particulate loading filter elements 296 and does not perform contaminant absorption. Contaminated fluid can be pumped into housing where particulate loading filter elements 296 remove particulates that could otherwise clog contaminant absorption filter elements contained in the second stage, housing 294 in serious therewith. Preferably, the particulate loading filter elements have an absolute filtration efficiency before giving flow rate of between 1 and 5 micron. Generally, the pore size of the particulate loading filter elements 296 is smaller then that of the contaminant absorption filter elements 298 to thereby prevent plugging. The particular loading filter elements 296 may therefore also be changed at different intervals relative to the contaminant absorption filter elements 298.

Additionally, both embodiments FIGS. 17 and 18 may employ an acid wash system 136 that is the same and includes similar components as that indicated for the embodiment of FIG. 9 such that common reference numbers are used. Generally, the acid wash system employs a reservoir 138 of acid wash which can be flushed through the contaminant absorption filter elements. Appropriate valves, 128, 140, 142 and 144 are provided to isolate the filter housing and contaminant absorption filter elements from upstream and downstream systems and/or to provide for a desired residence time of acid wash within the housing. An acid wash collection reservoir 148 is also provided to collect the acid wash including dissolved toxic heavy metal particulates after it has rejuvenated the life span of the contaminant absorption filter elements.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for treating contaminated fluid, the apparatus comprising: a porous lattice substrate; and an adsorbent material affixed to the lattice substrate, wherein the lattice substrate is formed from a metal wire, wherein the adsorbent material comprises self-assembled monolayers on mesoporous supports (SAMMS) with an average coating thickness of between about 1 and about 40 micron.

2. The apparatus of claim 1, wherein the adsorbent material comprises:
a mesoporous material substantially coating at least a portion of the porous lattice substrate, the mesoporous material having a plurality of mesopores; and
a plurality of functional molecules attached to the mesoporous material and configured for removal of at least one contaminant.

3. The apparatus of claim 2, wherein the mesoporous material is an integral film coating encapsulating at least 90% of the lattice substrate, and wherein the lattice substrate defines macropores for fluid flow.

4. The apparatus of claim 2, wherein the functional molecules comprise molecules from a thiol group, wherein the apparatus is adapted for removal of at least mercury.

5. The apparatus of claim 2, wherein the functional molecules are selected from at least one functional molecule selected the group consisting of a thiol, an amine, a thioalkoxide, polycarboxylic acids, ethylenediamine, bipyridyl, phenanthroline, phenols, polyhydroxyaromatic, carbonyl compounds, phosphine, phosphine oxide, isonitrile and combinations thereof.

6. The apparatus of claim 2, wherein the mesoporous material is formed as a film on the lattice substrate with an average thickness of less than 30 micron.

7. The apparatus of claim 6, wherein the average thickness is less than 20 micron.

8. The apparatus of claim 6, wherein the average thickness is between about 1 and about 3 micron.

9. The apparatus of claim 2, wherein the mesoporous material is a powder coating on the lattice substrate.

10. The apparatus of claim 1, wherein a layer of the metal wire has a calculated surface area of SAMMS that is greater than 5,000 square feet/cubic foot.

11. The apparatus of claim 1 wherein the lattice substrate is sintered wire mesh comprising sintered metal fibers film coated with the adsorbent material.

12. The apparatus of claim 11, wherein the sintered metal fibers have an average wire thickness of between 1 and 30 micron; the average coating thickness of adsorbent material between about 1 micron and about 20 micron, and a porosity after coating of greater than 50%.

13. The apparatus of claim 12, wherein the metal fibers have an average wire thickness of between about 1 and about 20 micron, with the average coating thickness of between about 1 and about 5 micron, with a resulting porosity after coating of greater than 60%.

14. The apparatus of claim 13, wherein the sintered wire mesh has a layer thickness of between about 50 micron and about 300 micron.

15. The apparatus of claim 14, wherein the sintered wire mesh has a calculated surface area of SAMMS coating that is greater than 5,000 square feet/cubic foot.

16. The apparatus of claim 15, wherein the calculated surface area is greater than 15,000 square feet/cubic foot.

17. The apparatus of claim 15, wherein the sintered wire mesh is formed from stainless steel.

18. The apparatus of claim 13, further comprising multiple stacked layers of the sintered wire mesh secured together, the fluid flow path passing in series through the multiple layers of the sintered wire mesh.

19. The apparatus of claim 18, wherein the multiple layers of the sintered wire mesh form a brick adapted for mounting in a reactor.

20. The apparatus of claim 13, wherein the wire mesh is wound in a spiral wrapped configuration into a generally cylindrical filter element, and wherein the wire mesh extends substantially the length of the filter element, wherein the filter element defines an internal cavity having first and second end caps in axially spaced relation, the wire mesh extending axially between the end caps.

21. The apparatus of claim 20, further comprising particulate filtration media in combination with SAMMS coated wire mesh.

22. The apparatus of claim 13, wherein the wire mesh is in the form of at least one strip wound into a generally cylindrical filter element, and wherein the at least one strip has a width substantially less than the length of the filter element, wherein the filter element defines an internal cavity having first and second end caps in axially spaced relation, the at least one strip extending axially between the end caps.

23. The apparatus of claim 22 wherein the at least one strip has a helical and overlapping configuration.

24. The apparatus of claim 22, further comprising at least one particulate filtration strip in combination with the at least one strip of wire mesh coated with SAMMS.

25. The apparatus of claim 13, further comprising a prefilter element in combination with the adsorption element, the prefilter element adapted to be arranged upstream relative to the adsorption element, the prefilter element adapted to substantially filter out particulates of a size that would tend the wire mesh.

26. The apparatus of claim 25, wherein the prefilter has a particulate removal efficiency of greater than about 90% of between 0.2 micron and 5 micron.

27. The apparatus of claim 1, wherein the wire material has an average wire thickness of between about 4 mils and about 12 mils, and a coating thickness of contaminant adsorbent material of between about 10 and about 40 micron.

28. The apparatus of claim 27, wherein the contaminant adsorbent material includes an integral film coating with the coating thickness of contaminant adsorbent material being less than 30 micron.

29. The apparatus of claim 27, wherein the wire material takes the form of one of a woven wire mesh, a gauze packing, and a grid structure.

30. The apparatus of claim 29, wherein the wire material has a layer thickness of between about 4 mil and about 3/16th of an inch, and a porosity prior to coating of greater than 50%.

31. The apparatus of claim 30, wherein the wire material is formed with channels having a depth of between about 3 and about 30 millimeters.

32. The apparatus of claim 28, wherein a layer of the wire material has a calculated surface area of SAMMS that is greater than 5,000 square feet/cubic foot.

33. The apparatus of claim 32, wherein the calculated surface area is greater than 15,000 square feet/cubic foot.

34. The apparatus of claim 30, further comprising multiple stacked layers of the wire material secured together, the fluid flow path passing in series through the multiple layers.

35. The apparatus of claim 34, wherein the multiple layers form a brick adapted for mounting in a reactor.

36. The apparatus of claim 34, wherein the wire mesh is wound in a spiral wrapped configuration into a generally cylindrical filter element, and wherein the wire mesh extends substantially the length of the filter element, wherein the filter element defines an internal cavity having first and second end caps in axially spaced relation, the wire mesh extending axially between the end caps.

37. The apparatus of claim 30, further comprising particulate filtration media in combination with the coated wire material.

38. The apparatus of claim 30, wherein the wire material is in the form of at least one strip wound into a generally cylindrical filter element, and wherein the at least one strip has a width substantially less than the length of the filter element, wherein the filter element defines an internal cavity having first and second end caps in axially spaced relation, the at least one strip extending axially between the end caps.

39. The apparatus of claim 38 wherein the at least one strip has a helical and overlapping configuration.

40. The apparatus of claim 38, further comprising at least one particulate filtration strip in combination with the coated wire material.

41. The apparatus of claim 30, further comprising a prefilter element in combination with the adsorption element, the prefilter element adapted to be arranged upstream relative to the adsorption element, the prefilter element adapted to substantially filter out particulates of a size that would tend the wire mesh.

42. The apparatus of claim 41, wherein the prefilter has a particulate removal efficiency of greater than about 90% of between 0.2 micron and 5 micron.

43. A system for adsorption of contaminated fluid comprising:
a plurality of adsorption filtration elements, each adsorption filtration elements including a porous lattice substrate having a fluid flow path therethrough; and an adsorbent material affixed to the lattice substrate, wherein the lattice substrate is formed from metal wires, wherein the adsorbent material comprises self-assembled monolayers on mesoporous supports (SAMMS) with an average coating thickness of between about 1 and about 40 micron; and
a housing having an inlet and an outlet, the adsorption elements being arranged in series between the inlet and the outlet for adsorbing contaminant in fluid flowing therebetween.

44. The system of claim 43, wherein at least some of the adsorption elements are arranged in fluid parallel with each other.

45. The system of claim 43, wherein a layer of the wires has a calculated surface area of SAMMS that is greater than 5,000 square feet/cubic foot.

46. The system of claim 43, wherein the metal wires that has a film coating of the adsorbent material, the metal wires having an average wire thickness of between 1 and 30 micron or alternatively between about 4 mil and about 12 mil; a coating thickness of contaminant adsorbent material between about 1 micron and about 40 micron, and a porosity after coating of greater than 50%.

47. The system of claim 46, wherein the metal wires are sintered wire mesh having metal fibers with an average wire thickness of between about 1 and about 20 micron, wherein the coating thickness of between about 1 and about 5 micron, with a resulting porosity after coating of greater than 60%.

48. The system of claim 46, further comprising at least one prefilter element in combination with the adsorption filter elements, the at least one prefilter element arranged in series upstream relative to the adsorption elements and including at least one of a depth loading and a surface loading filtration media, the at least one prefilter element adapted to substantially filter out particulates of a size that would plug the porous lattice substrate.

49. The system of claim 48, wherein the at least one prefilter has a particulate removal efficiency of greater than about 90% of between 0.2 micron and 5 micron.

50. The system of claim 48, wherein the at least one prefilter element is arranged in a prefilter housing separate from said housing to provide for two stages of filtration, the at least one prefilter element being replaceable separately from the adsorption filter element.

51. The system of claim 50, further comprising an acid wash system and valve for isolating the housing with adsorption elements therein from the prefilter housing, the acid wash system including a supply of acid wash that is adapted to strip adsorbed contaminants on the adsorption filter elements.

52. The system of claim 46 wherein the adsorption filtration elements further include particulate filtration media in combination with the porous lattice substrate, the particulate filtration media including at least one of a depth loading media and a barrier filtration media.

53. The system of claim 46, further comprising an acid wash system, the acid wash system including a supply of acid wash that is adapted to strip adsorbed contaminants on the adsorption filter elements.

54. An apparatus for treating contaminated fluid, the apparatus comprising: a porous lattice substrate; and an adsorbent material affixed to the lattice substrate, wherein the lattice substrate is formed from a metal wire, wherein the adsorbent material comprises Self-Assembled Monolayers on Mesoporous Supports (SAMMS), wherein a layer of the metal wire has a calculated surface area of SAMMS that is greater than 5,000 square feet/cubic foot.

55. The apparatus of claim 54, wherein the lattice substance is sintered wire mesh comprising sintered metal fibers film coated with the adsorbent material.

56. The apparatus of claim 55, wherein the sintered metal fibers have an average wire thickness of between 1 and 30 micron; a coating thickness of adsorbent material between about 1 micron and about 20 micron, and a porosity after coating of greater than 50%.

57. The apparatus of claim 56, wherein the metal fibers have an average wire thickness of between about 1 and about 20 micron, with an average coating thickness of between about 1 and about 5 micron, with a resulting porosity after coating of greater than 60%.

58. The apparatus of claim 55, wherein the sintered wire mesh has a layer thickness of between about 50 micron and about 300 micron.

59. The apparatus of claim 55, wherein the calculated surface area is greater than 10,000 square feet/cubic foot.

* * * * *

UNITED STATES PATENT AND TRADEMARK OFFICE
CERTIFICATE OF CORRECTION

| | | |
|---|---|---|
| PATENT NO. | : 8,293,105 B2 | Page 1 of 1 |
| APPLICATION NO. | : 12/468386 | |
| DATED | : October 23, 2012 | |
| INVENTOR(S) | : John A. Krogue and Timothy L. Holmes | |

It is certified that error appears in the above-identified patent and that said Letters Patent is hereby corrected as shown below:

Col. 20, Lines 55-57 should read

55. The apparatus of claim 54, wherein the lattice ~~substance~~ substrate is sintered wire mesh comprising sintered metal fibers film coated with the adsorbent material.

Signed and Sealed this
Twenty-second Day of January, 2013

David J. Kappos
*Director of the United States Patent and Trademark Office*